United States Patent
Tamura

(10) Patent No.: US 11,007,870 B2
(45) Date of Patent: May 18, 2021

(54) FOUR-WHEEL DRIVE VEHICLE

(71) Applicant: TOYOTA JIDOSHA KABUSHIKI KAISHA, Toyota (JP)

(72) Inventor: Hiroshi Tamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 114 days.

(21) Appl. No.: 16/578,492

(22) Filed: Sep. 23, 2019

(65) Prior Publication Data
US 2020/0094674 A1 Mar. 26, 2020

(30) Foreign Application Priority Data

Sep. 25, 2018 (JP) .............................. JP2018-179486

(51) Int. Cl.
| | |
|---|---|
| B60K 17/354 | (2006.01) |
| F16D 23/04 | (2006.01) |
| B60K 17/02 | (2006.01) |
| F16D 21/08 | (2006.01) |
| F16D 11/00 | (2006.01) |

(52) U.S. Cl.
CPC .......... B60K 17/354 (2013.01); B60K 17/02 (2013.01); F16D 21/08 (2013.01); F16D 23/04 (2013.01); *F16D 2011/002* (2013.01); *F16D 2011/004* (2013.01); *F16D 2500/10431* (2013.01); *F16D 2500/50638* (2013.01)

(58) Field of Classification Search
CPC ........... F16D 201/002; F16D 2011/004; F16D 23/04; F16D 2023/0631; B60K 17/344; B60K 17/346; B60K 17/22; B60K 17/354
See application file for complete search history.

(56) References Cited

U.S. PATENT DOCUMENTS

| | | | |
|---|---|---|---|
| 2014/0274543 A1* | 9/2014 | Fujii | F16D 27/06 475/231 |
| 2016/0107523 A1* | 4/2016 | Maeda | B60K 17/02 180/245 |
| 2017/0036540 A1* | 2/2017 | Yoshimura | F16D 21/08 |
| 2017/0182886 A1* | 6/2017 | Horie | B60K 17/354 |

FOREIGN PATENT DOCUMENTS

JP 2017-114460 A 6/2017

* cited by examiner

*Primary Examiner* — Stacey A Fluhart
(74) *Attorney, Agent, or Firm* — Oliff PLC

(57) ABSTRACT

A four-wheel drive vehicle comprises: main drive wheels and sub-drive wheels; a first input rotating member; a first output rotating member; a second input rotating member; a second output rotating member; a first dog clutch; a second dog clutch; a synchromesh mechanism. In the case of canceling a disconnect state in which the power transmitting member interrupts power transmission from the drive power source and the sub-drive wheels, the control device controls an engagement torque of the coupling to a preset first torque and operates the synchromesh mechanism to engage the first dog clutch when it is determined that the rotation speeds are synchronized between the second input rotating member and the second output rotating member, and controls the engagement torque of the coupling to a second torque smaller than the first torque to engage the second dog clutch when it is determined that the first dog clutch is engaged.

16 Claims, 6 Drawing Sheets

FOUR-WHEEL DRIVE VEHICLE

This application claims priority from Japanese Patent Application No. 2018-179486 filed on Sep. 25, 2018, the disclosure of which is incorporated herein by reference in its entirety.

FIELD OF THE INVENTION

The present invention relates to a technique, related to a four-wheel drive vehicle including a coupling, a first dog clutch, and a second dog clutch and engaging each of the coupling, the first dog clutch, and the second dog clutch to cancel a disconnect state, for suitably suppressing deterioration of NV performance at the time of engagement of the second dog clutch.

DESCRIPTION OF THE RELATED ART

There is known a four-wheel drive vehicle comprising: (a) main drive wheels and sub-drive wheels; (b) a first input rotating member to which a portion of a drive power from a drive power source toward the main drive wheels is input; (c) a first output rotating member coupled via a power transmitting member to the sub-drive wheels and rotating around the same first rotation axis as the first input rotating member; (d) a second input rotating member disposed on a power transmission path between the power transmitting member and the sub-drive wheels and coupled to the sub-drive wheels; (e) a second output rotating member disposed on the power transmission path between the power transmitting member and the sub-drive wheels and rotating around the same second rotation axis as the second input rotating member; (f) a coupling disposed on a power transmission path between the power transmitting member and the second output rotating member; (g) a first dog clutch including a first sleeve spline-fitted to one of the first input rotating member and the first output rotating member and moved in the first rotation axis direction to selectively mesh with the other of the first input rotating member and the first output rotating member; (h) a second dog clutch including a second sleeve spline-fitted to one of the second input rotating member and the second output rotating member and moved in the second rotation axis direction to selectively mesh with the other of the second input rotating member and the second output rotating member; (i) a synchromesh mechanism included in the second dog clutch and arranged in series with the second sleeve in the second rotation axis direction to synchronize rotation speeds between the second input rotating member and the second output rotating member when the second sleeve is moved in the second rotation axis direction; and (j) a control device controlling each of the coupling, the first dog clutch, and the second dog clutch. For example, this corresponds to a four-wheel drive vehicle described in Patent Document 1. In the description of the four-wheel drive vehicle of Patent Document 1, in the case of canceling a disconnect state in which the power transmitting member interrupts the power transmission from the drive power source and the sub-drive wheels, when the rotation speeds are synchronized between the second input rotating member and the second output rotating member by engaging the coupling and operating the synchromesh mechanism, the first dog clutch is engaged, and the second dog clutch is then engaged.

PRIOR ART DOCUMENT

Patent Document
    Patent Document 1: Japanese Laid-Open Patent Publication No. 2017-114460

SUMMARY OF THE INVENTION

Technical Problem
    When the disconnect state is canceled in a four-wheel drive vehicle as described in Patent Document 1, an engagement torque of the coupling is maintained such that the coupling can directly be coupled, i.e., a rotation speed of a rotating member on the power transmitting member side of the coupling becomes equal to a rotation speed of a rotating member on the second output rotating member side of the coupling. Therefore, at the time of engagement of the second dog clutch, the coupling is directly connected, so that while the second output rotating member is integrally coupled to, for example, rotating members such as the power transmitting member, the first input rotating member, and the first output rotating member, the second sleeve must be moved in the second rotation axis direction to mesh with the other of the second input rotating member and the second output rotating member, and thus, it is necessary to make the load acting on the second sleeve relatively large when the second sleeve is moved in the second rotation axis direction. This causes a problem that when the second sleeve meshes with the other of the second input rotating member and the second output rotating member, a relatively large collision sound is generated, which deteriorates NV performance (noise vibration performance).
    The present invention was conceived in view of the situations and it is therefore an object of the present invention to provide a four-wheel drive vehicle including a control device configured to suitably suppress the deterioration of the NV performance at the time of engagement of the second dog clutch.
Solution to Problem
    To achieve the above object, a first aspect of the present invention provides a four-wheel drive vehicle comprising: (a) main drive wheels and sub-drive wheels; a first input rotating member to which a portion of a drive power from a drive power source toward the main drive wheels is input; a first output rotating member coupled via a power transmitting member to the sub-drive wheels wherein the first input rotating member and the first output rotating member rotate around a common first rotation axis; a second input rotating member disposed on a power transmission path between the power transmitting member and the sub-drive wheels and coupled to the sub-drive wheels; a second output rotating member disposed on the power transmission path between the power transmitting member and the sub-drive wheels wherein the second input rotating member and the second output rotating member rotate around a common second rotation axis; a coupling disposed on a power transmission path between the power transmitting member and the second output rotating member; a first dog clutch including a first sleeve spline-fitted to one of the first input rotating member and the first output rotating member and moved in a first rotation axis direction to selectively mesh with the other of the first input rotating member and the first output rotating member; a second dog clutch including a second sleeve spline-fitted to one of the second input rotating member and the second output rotating member and moved in a second rotation axis direction to selectively mesh with the other of the second input rotating member and the second output rotating member; a synchromesh mechanism included in the second dog clutch and arranged in series with the second sleeve in the second rotation axis direction to synchronize rotation speeds between the second input rotating member and the second output rotating member when the second sleeve is moved in the second rotation axis direction; and a control device controlling each of the coupling, the first dog clutch, and the second dog clutch, wherein (b) in the case of canceling a disconnect state in which the power transmitting member interrupts power transmission from the drive power source and the sub-drive wheels, the control device controls an engagement torque of the coupling to a preset first torque and operates the synchromesh mechanism to engage the first dog clutch when it is determined that the rotation speeds are synchronized between the second input rotating member and the second output rotating member, and controls the engagement torque of the coupling to a second torque smaller than the first torque to engage the second dog clutch when it is determined that the first dog clutch is engaged.

Advantageous Effects of Invention

According to the four-wheel drive vehicle recited in the first aspect of the invention, in the case of canceling the disconnect state in which the power transmitting member interrupts the power transmission from the drive power source and the sub-drive wheels, the control device controls the engagement torque of the coupling to the preset first torque and operates the synchromesh mechanism to engage the first dog clutch when it is determined that the rotation speeds are synchronized between the second input rotating member and the second output rotating member, and controls the engagement torque of the coupling to the second torque smaller than the first torque to engage the second dog clutch when it is determined that the first dog clutch is engaged. Therefore, when the second dog clutch is engaged, even if the load acting on the second sleeve is reduced, the second sleeve mesh with the other of the second input rotating member and the second output rotating member. As a result, the load acting on the second sleeve can suitably be reduced, and the deterioration of the NV performance can be suppressed.

DESCRIPTION OF EMBODIMENTS

Figure 1:
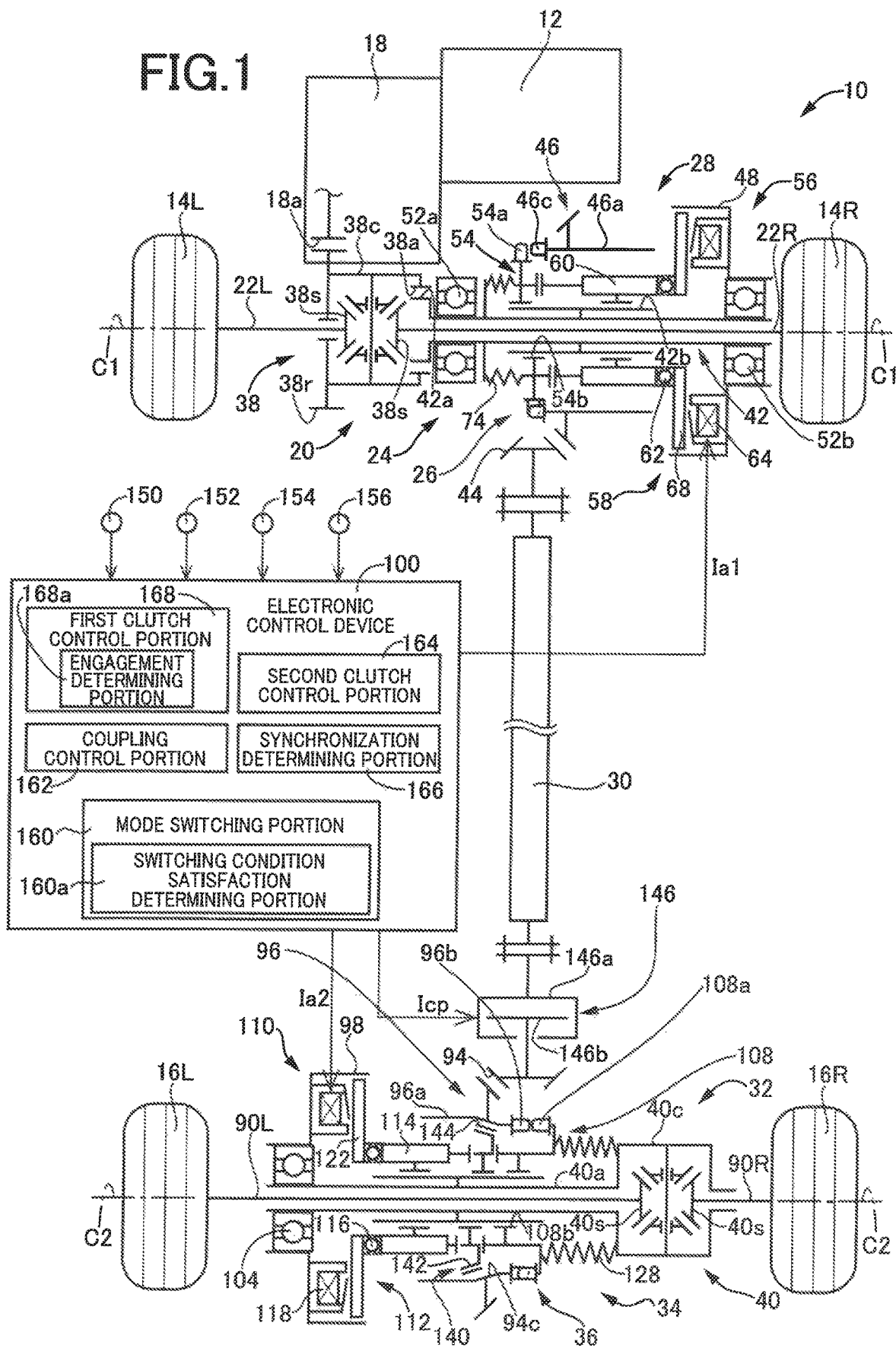
FIG. 1 is a schematic for schematically explaining a configuration of a four-wheel drive vehicle to which the present invention is preferably applied.

A second aspect of the present invention provides the four-wheel drive vehicle recited in the first aspect of the invention, wherein the first torque is an engagement torque enabling direct coupling of the coupling such that a rotation speed of the first output rotating member and the rotation speed of the second output rotating member become equal when the synchromesh mechanism is operating. Therefore, when the rotation speeds are synchronized between the second input rotating member and the second output rotating member, the rotation speeds are suitably synchronized between the first input rotating member and the first output rotating member, so that even if the first dog clutch is engaged immediately after the control device determines that the synchronization of the rotation speeds between the second input rotating member and the second output rotating member is completed, the first sleeve suitably mesh with the other of the first input rotating member and the first output rotating member.

A third aspect of the present invention provides the four-wheel drive vehicle recited in the first or second aspect of the invention, wherein (a) the second sleeve includes meshing teeth for meshing with second meshing teeth formed on the second output rotating member and is disposed relatively non-rotatably with respect to the second input rotating member and movably in the second rotation axis direction with respect to the second input rotating member, and wherein the four-wheel drive vehicle includes (b) a spring urging the second sleeve from a non-meshing position at which meshing is released between the meshing teeth and the second meshing teeth to a meshing position at which the meshing teeth are meshed with the second meshing teeth, (c) an actuator, and (d) a ratchet mechanism that includes a first piston reciprocated in the second rotation axis direction by the actuator, a second piston moving the second sleeve to the non-meshing position against an urging force of the spring in accordance with the first piston, and a holder having a plurality of latching teeth and latching the second piston moved due to the first piston with one of the plurality of latching teeth and that changes a position of the second piston latched with the latching teeth of the holder to move the second sleeve between the non-meshing position and the meshing position. Therefore, even if the spring load urging the second sleeve from the non-meshing position toward the meshing position is suitably reduced in the spring, the second sleeve can be moved from the non-meshing position to the meshing position by the urging force of the spring.

A fourth aspect of the present invention provides the four-wheel drive vehicle recited in any one of the first to third aspects of the invention, wherein the second torque is larger than zero. Therefore, when the second dog clutch is engaged, the rotation speed of the second output rotating member is preferably prevented from decreasing due to the rotation resistance etc. of the second output rotating member.

A fifth aspect of the present invention provides the four-wheel drive vehicle recited in any one of the first to fourth aspects of the invention, wherein the main drive wheels are front wheels, and wherein the sub-drive wheels are rear wheels. Therefore, the present invention can suitably be applied to an FF-based (front-engine/front-drive-based) four-wheel drive vehicle.

An example of the present invention will now be described in detail with reference to the drawings. In the following example, the figures are simplified or deformed as needed and portions are not necessarily precisely drawn in terms of dimension ratio, shape, etc.

FIRST EXAMPLE

FIG. 1 is a schematic for schematically explaining a configuration of a four-wheel drive vehicle 10 to which the present invention is preferably applied. In FIG. 1, the four-wheel drive vehicle 10 has an FF-based four-wheel drive device. The four-wheel drive device includes a first power transmission path transmitting a drive power from an engine (drive power source) 12 to a left-and-right pair of front wheels (main drive wheels) 14L, 14R, and a second power transmission path transmitting a portion of the drive power of the engine 12 to a left-and-right pair of rear wheels (sub-drive wheels) 16L, 16R in a four-wheel drive state.

When the four-wheel drive vehicle 10 is in a two-wheel drive state, the drive power transmitted from the engine 12 through an automatic transmission 18 is transmitted through a front-wheel drive power distributing device 20 and a left-and-right pair of front wheel axles 22L, 22R to the front wheels 14L, 14R. In the two-wheel drive state, at least a first dog clutch 26 of a first connecting/disconnecting device 24 is released, and the drive power is not transmitted from the engine 12 to a transfer 28, a propeller shaft (power transmitting member) 30, a rear-wheel drive power distributing device 32, and the rear wheels 16L, 16R. However, when the four-wheel drive vehicle 10 is in the four-wheel drive state, the first dog clutch 26 and a second dog clutch 36 of a second connecting/disconnecting device 34 are both engaged, and the drive power is transmitted from the engine 12 to the transfer 28, the propeller shaft 30, the rear-wheel drive power distributing device 32, and the rear wheels 16L, 16R. The front-wheel drive power distributing device 20 distributes the drive power transmitted from the engine 12 via a first differential device 38 to the front wheels 14L, 14R when the four-wheel drive vehicle 10 is in the two-wheel drive state or the four-wheel drive state. The rear-wheel drive power distributing device 32 distributes the drive power transmitted from the engine 12 via a second differential device 40 to the rear wheels 16L, 16R when the four-wheel drive vehicle 10 is in the four-wheel drive state.

As shown in FIG. 1, the front-wheel drive power distributing device 20 includes the first differential device 38 disposed rotatably around a first rotation axis C1. For example, the first differential device 38 includes a ring gear 38r meshed with an output gear 18a of the automatic transmission 18, a differential casing 38c integrally fixed to the ring gear 38r and having a pair of side gears 38s assembled therein, etc. When the drive power is transmitted from the engine 12 to the ring gear 38r, the first differential device 38 configured as described above transmits the drive power to the front wheels 14L, 14R while allowing a differential rotation of the left and right front wheel axles 22L, 22R. The differential casing 38c is provided with inner circumferential meshing teeth 38a fitted to first outer circumferential spline teeth 42a formed on an axial end portion on the front wheel 14L side of an input shaft 42 disposed in the transfer 28. As a result, a portion of the drive power transmitted from the engine 12 to the differential casing 38c is input to the transfer 28 via the input shaft 42. Therefore, a portion of the drive power transmitted from the engine 12 to the differential casing 38c, i.e., a portion of the drive power from the engine 12 toward the front wheels 14L, 14R, is input to the input shaft 42.

Figure 2:
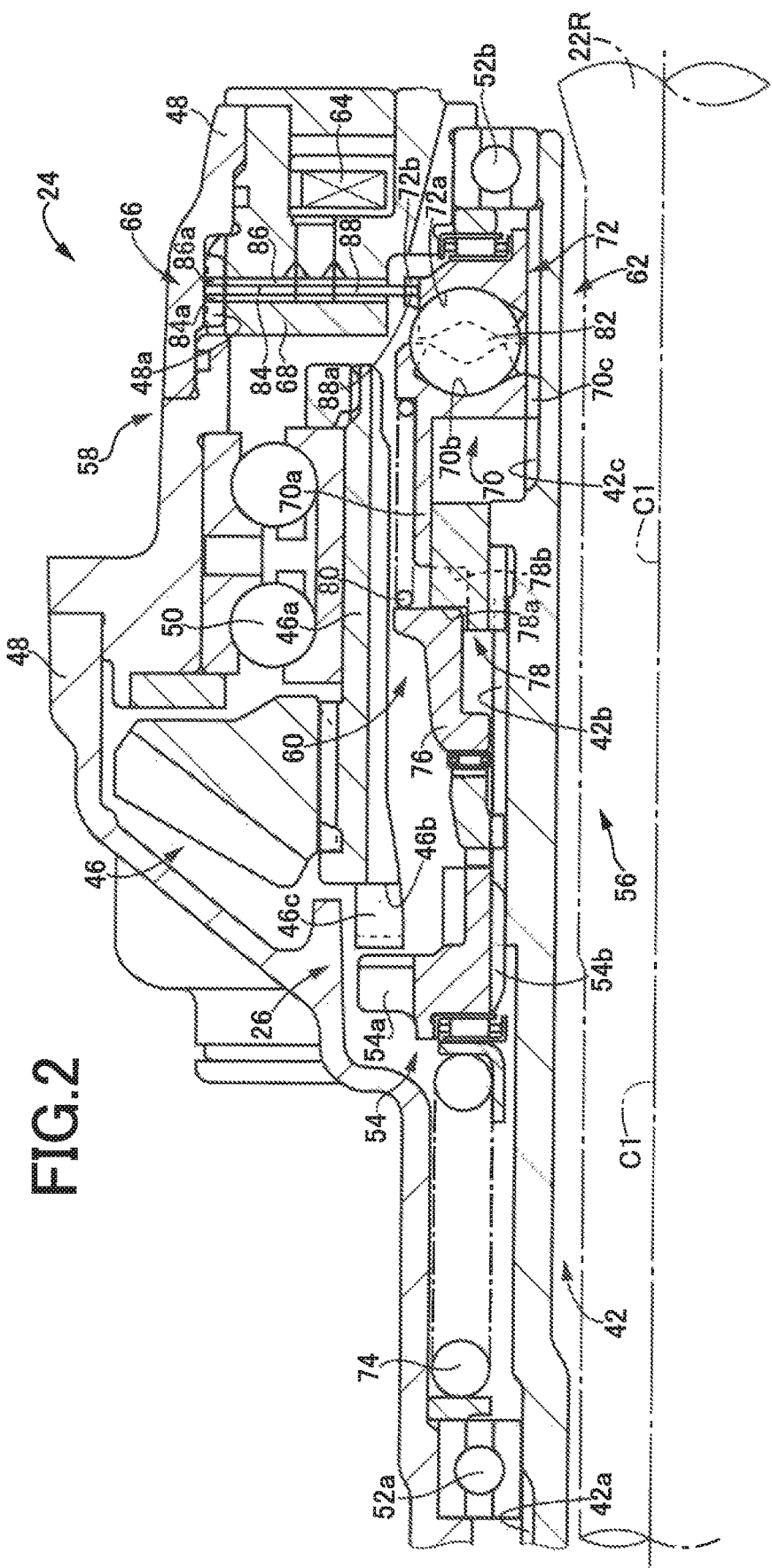
FIG. 2 is a cross-sectional view for explaining a configuration of a first connecting/disconnecting device disposed on the four-wheel drive vehicle of FIG. 1.

As shown in FIGS. 1 and 2, the transfer 28 includes the cylindrical input shaft 42, a cylindrical first ring gear 46, and the first connecting/disconnecting device 24. The first ring gear 46 is meshed with a driven pinion 44 (see FIG. 1) coupled to an end portion of the propeller shaft 30 on the side of the front wheels 14L, 14R. The first connecting/disconnecting device 24 selectively disconnects or connects a power transmission path between the input shaft 42 and the first ring gear 46, i.e., a power transmission path between the engine 12 and the propeller shaft 30. When the first connecting/disconnecting device 24 connects the power transmission path between the input shaft 42 and the first ring gear 46, the transfer 28 outputs to the propeller shaft 30 a portion of the drive power transmitted from the engine 12 to the differential casing 38c.

As shown in FIG. 2, the cylindrical first ring gear 46 is a bevel gear having helical teeth or a hypoid gear formed thereon, for example. The first ring gear 46 is provided with a shaft portion 46a projected in a substantially cylindrical shape from an inner circumferential portion of the first ring gear 46 toward the front wheel 14R. For example, the cylindrical first ring gear 46 has the shaft portion 46a supported by a first casing 48 via a bearing 50 disposed in the first casing 48 housing the first connecting/disconnecting device 24 etc. and is thereby supported rotatably around the first rotation axis C1 in a cantilevered manner. The first ring gear 46 is coupled to the rear wheels 16L, 16R in a power transmittable manner via the propeller shaft 30 etc. with the second dog clutch 36 engaged.

As shown in FIG. 2, the cylindrical input shaft 42 penetrates through the cylindrical first ring gear 46, and a portion of the input shaft 42 is disposed inside the first ring gear 46. The cylindrical input shaft 42 has both end portions supported by the first casing 48 via a pair of bearings 52a, 52b disposed in the first casing 48, so that the input shaft 42 is supported pivotally around the first rotation axis C1. In other words, the input shaft 42 is rotatably supported concentrically with the first ring gear 46. The cylindrical input shaft 42 is provided with the first outer circumferential spline teeth 42a formed on an outer circumferential surface of the axial end portion of the input shaft 42 on the front wheel 14L side, second outer circumferential spline teeth 42b formed on an outer circumferential surface of a central portion of the input shaft 42, and third outer circumferential spline teeth 42c formed on an outer circumferential surface of the end portion of the input shaft 42 on the front wheel 14R side.

As shown in FIG. 2, the first dog clutch 26 includes a plurality of first meshing teeth 46c and a cylindrical first movable sleeve (first sleeve) 54. The first meshing teeth 46c are formed on a side surface 46b of the shaft portion 46a of the first ring gear 46 on the front wheel 14L side. The first movable sleeve 54 is provided with a plurality of first meshing teeth 54a that can mesh with the first meshing teeth 46c. The first movable sleeve 54 is provided with inner circumferential meshing teeth 54b meshed with the second outer circumferential spline teeth 42b formed on the input shaft 42 relatively non-rotatably around the first rotation axis C1 with respect to the input shaft 42 and relatively movably in a first rotation axis C1 direction with respect to the input shaft 42. Therefore, the first movable sleeve 54 has the inner circumferential meshing teeth 54b spline-fitted to the second outer circumferential spline teeth 42b of the input shaft 42, and the first movable sleeve 54 is moved in the first rotation axis C1 direction by a first moving device 56 described later so that the first meshing teeth 54a of the first movable sleeve 54 selectively mesh with the first meshing teeth 46c of the first ring gear 46.

As shown in FIG. 2, the first moving device 56 selectively moves the first movable sleeve 54 in the first rotation axis C1 direction to a first meshing position and a first non-meshing position to selectively engage the first dog clutch 26. The first meshing position is a position at which the first meshing teeth 54a of the first movable sleeve 54 are meshed with the first meshing teeth 46c of the first ring gear 46. At the first meshing position, the first ring gear 46 and the first movable sleeve 54 cannot relatively rotate, and the first dog clutch 26 is engaged. The first non-meshing position is a position at which the first meshing teeth 54a of the first movable sleeve 54 are not meshed with the first meshing teeth 46c of the first ring gear 46. At the first non-meshing position, the first ring gear 46 and the first movable sleeve 54 can relatively rotate, and the first dog clutch 26 is released.

As shown in FIG. 2, the first moving device 56 includes a first electromagnetic actuator 58 and a first ratchet mechanism 60. The first electromagnetic actuator 58 includes, for example, a first ball cam 62, a first electromagnetic coil 64, a first auxiliary clutch 66, etc. In the first electromagnetic actuator 58, when a first movable piece 68 is attracted by the first electromagnetic coil 64 and a rotation braking torque is generated in an annular second cam member 72 via a first auxiliary clutch 66 while the input shaft 42 is rotating, i.e., during vehicle running, the annular second cam member 72 and an annular first cam member 70 are relatively rotated to move the first cam member 70 in the first rotation axis C1 direction. The first ball cam 62 includes the first and second cam members 70 and 72, as described below. When the first cam member 70 is moved in the first rotation axis C1 direction by the first electromagnetic actuator 58, the first ratchet mechanism 60 retains a movement position of the first movable sleeve 54 moved in the first rotation axis C1 direction due to the movement of the first cam member 70. The first moving device 56 includes a first spring 74 constantly urging the first movable sleeve 54 from the first non-meshing position toward the first meshing position, i.e., constantly urging the first movable sleeve 54 toward the front wheel 14R in the first rotation axis C1 direction.

As shown in FIG. 2, the first ratchet mechanism 60 includes an annular first piston 70a, an annular second piston 76, and an annular holder 78 having a plurality of latching teeth, i.e., first latching teeth 78a and second latching teeth 78b, in a circumferential direction. The first ratchet mechanism 60 includes a coil spring 80 disposed in a compressed state between the second piston 76 and the first cam member 70 so as to constantly urge the first cam member 70 toward the second cam member 72. The first piston 70a is reciprocated in the first rotation axis C1 direction with a predetermined stroke by the first ball cam 62 due to the first electromagnetic coil 64 attracting the first movable piece 68 and not attracting the first movable piece 68. Therefore, the first piston 70a is reciprocated in the first rotation axis C1 direction with the predetermined stroke by the operation of the first electromagnetic actuator 58. The second piston 76 moves the first movable sleeve 54 to the first non-meshing position against urging force of the first spring 74 due to the reciprocation of the first piston 70a in the first rotation axis C1 direction. The holder 78 latches the second piston 76 moved by the first piston 70a with one of the first latching teeth 78a and the second latching teeth 78b. The first piston 70a is disposed on the input shaft 42 relatively non-rotatably with respect to the input shaft 42 and movably in the first rotation axis C1 direction with respect to the input shaft 42. The second piston 76 is disposed on the input shaft 42 relatively rotatably with respect to the input shaft 42 and movably in the first rotation axis C1 direction with respect to the input shaft 42. The holder 78 is disposed on the input shaft 42 relatively non-rotatably with respect to the input shaft 42 and immovably in the first rotation axis C1 direction with respect to the input shaft 42.

As shown in FIG. 2, the first ball cam 62 includes an annular pair of the first cam member 70 and the second cam member 72, and a plurality of spherical rolling elements 82. The first cam member 70 and the second cam member 72 are inserted in an overlapping manner in the first rotation axis C1 direction between the second piston 76 of the first ratchet mechanism 60 and the bearing 52b. The spherical rolling elements 82 are sandwiched between a cam surface 70b formed on the first cam member 70 and a cam surface 72a formed on the second cam member 72. When the first cam member 70 and the second cam member 72 are relatively rotated in the first ball cam 62 configured as described above, the first cam member 70 is separated from the second cam member 72 in the first rotation axis C1 direction. The first cam member 70 is provided with inner circumferential teeth 70c meshed with the third outer circumferential spline teeth 42c. The inner circumferential teeth 70c make the first cam member 70 relatively non-rotatable around the first rotation axis C1 with respect to the input shaft 42 and relatively movable in the first rotation axis C1 direction with respect to the input shaft 42.

As shown in FIG. 2, the first auxiliary clutch 66 includes the first movable piece 68 described above, a pair of disk-shaped first friction plates 84, 86 disposed between the first movable piece 68 and the first electromagnetic coil 64, and a disk-shaped second friction plate 88 disposed between the pair of first friction plates 84, 86. Outer circumferential portions of the pair of first friction plates 84, 86 are provided with outer circumferential teeth 84a, 86a respectively, meshed with inner circumferential spline teeth 48a formed on the first casing 48. The outer circumferential teeth 84a, 86a make the first friction plates 84, 86 relatively non-rotatable around the first rotation axis C1 with respect to the first casing 48 and relatively movable in the first rotation axis C1 direction with respect to the first casing 48. An inner circumferential portion of the second friction plate 88 is provided with inner circumferential teeth 88a meshed with outer circumferential spline teeth 72b formed on an outer circumferential portion of the second cam member 72. The inner circumferential teeth 88a make the second friction plate 88 relatively non-rotatable around the first rotation axis C1 with respect to the second cam member 72 and relatively movable in the first rotation axis C1 direction with respect to the second cam member 72.

In the first electromagnetic actuator 58 configured as described above, for example, when a first clutch drive current Ia1 (A) is supplied to the first electromagnetic coil 64 from an electronic control device (control device) 100 described later and the first movable piece 68 is attracted by the first electromagnetic coil 64 while the input shaft 42 is rotating i.e. during vehicle running, the first friction plates 84, 86 and the second friction plate 88 of the first auxiliary clutch 66 are clamped due to the first movable piece 68 between the first movable piece 68 and the first electromagnetic coil 64, so that a rotation braking torque is transmitted to the second friction plate 88, i.e., to the second cam member 72. Therefore, the first cam member 70 and the second cam member 72 are relatively rotated by the rotation braking torque, and the first piston 70a formed integrally with the first cam member 70 moves toward the front wheel 14L against the urging forces of the first spring 74 and the coil spring 80 in the first rotation axis C1 direction with respect to the second cam member 72 via the spherical rolling elements 82. When the first clutch drive current Ia1 (A) is reduced and the first movable piece 68 is no longer attracted by the first electromagnetic coil 64, the rotation braking torque is not transmitted to the second cam member 72, and therefore, the second cam member 72 is rotated together with the first cam member 70 via the spherical rolling elements 82 so that the first piston 70a is moved toward the front wheel 14R by the urging forces of the first spring 74 and the coil spring 80.

For example, when the first piston 70a is reciprocated once in the first rotation axis C1 direction toward the front wheel 14L and the front wheel 14R by the first electromagnetic actuator 58 in the first connecting/disconnecting device 24, as shown in FIG. 2, the first movable sleeve 54 is moved via the first ratchet mechanism 60 to the first non-meshing position against the urging force of the first spring 74, and the second piston 76 is latched on the first latching teeth 78a of the holder 78. For example, when the first piston 70a is reciprocated twice by the first electromagnetic actuator 58, i.e., when the first piston 70a is further reciprocated once while the first movable sleeve 54 is disposed at the first non-meshing position in the first connecting/disconnecting device 24, the second piston 76 is unlatched from the first latching teeth 78a of the holder 78, and when the second piston 76 is latched on the second latching teeth 78b of the holder 78, the first movable sleeve 54 is moved to the first meshing position by the urging force of the first spring 74.

Figure 3:
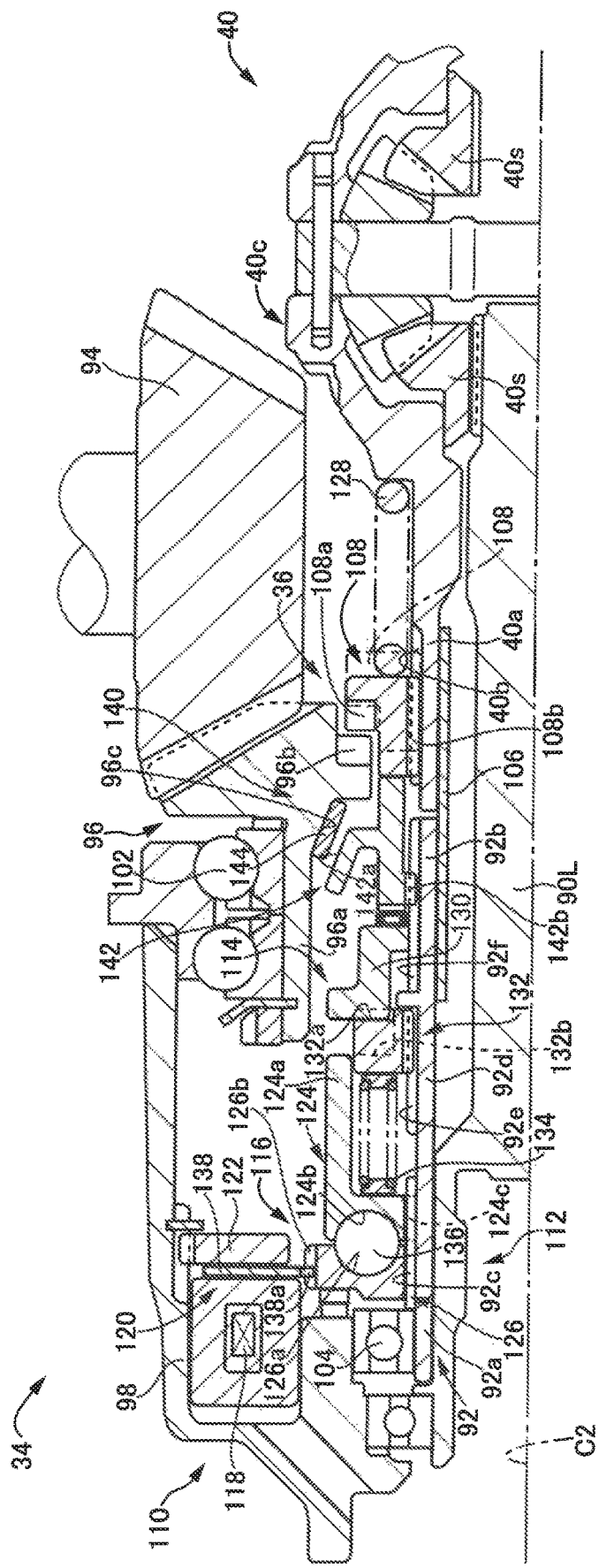
FIG. 3 is a cross-sectional view for explaining a configuration of a second connecting/disconnecting device disposed on the four-wheel drive vehicle of FIG. 1.

As shown in FIG. 1, the rear-wheel drive power distributing device 32 includes the second differential device 40 disposed rotatably around a second rotation axis C2. For example, the second differential device 40 includes a differential casing (second input rotating member) 40c having a pair of side gears 40s assembled therein, etc. When the drive power from the engine 12 is transmitted to the differential casing 40c, the second differential device 40 configured as described above transmits the drive power to the rear wheels 16L, 16R while allowing a differential rotation of a left-and-right pair of rear wheel axles 90L, 90R. As shown in FIG. 3, the differential casing 40c is provided with a cylinder portion 40a projected in a cylindrical shape from the differential casing 40c toward the rear wheel 16L side to cover an outer circumference of a portion of the rear wheel axle 90L. The differential casing 40c is disposed on a power transmission path between the propeller shaft 30 and the rear wheels 16L, 16R with the second dog clutch 36 engaged, and the differential casing 40c is coupled to the rear wheels 16L, 16R in a power transmittable manner with the second dog clutch 36 released.

As shown in FIG. 3, the rear-wheel drive power distributing device 32 includes a cylindrical cylinder member 92, a second ring gear (second output rotating member) 96, and the second connecting/disconnecting device 34. The cylinder member 92 is connected to the differential casing 40c of the second differential device 40 in a power transmittable manner. The second ring gear 96 is meshed with a drive pinion 94 coupled to an end portion of the propeller shaft 30 on the side of the rear wheels 16L, 16R. The second connecting/disconnecting device 34 selectively disconnects or connects a power transmission path between the cylinder member 92 or the differential casing 40c and the second ring gear 96, i.e., a power transmission path between the rear wheels 16L, 16R and the propeller shaft 30. When the second connecting/disconnecting device 34 connects the power transmission path between the differential casing 40c and the second ring gear 96, the rear-wheel drive power distributing device 32 outputs a portion of the drive power transmitted from the engine 12 to the left and right rear wheels 16L, 16R via the propeller shaft 30 if the first dog clutch 26 is engaged.

As shown in FIG. 3, the cylindrical second ring gear 96 is a bevel gear having helical teeth or a hypoid gear formed thereon, for example. The second ring gear 96 is provided with a shaft portion 96a projected in a substantially cylindrical shape from an inner circumferential portion of the second ring gear 96 toward the rear wheel 16L. For example, the second ring gear 96 has the shaft portion 96a supported by a second casing 98 via a bearing 102 disposed in the second casing 98 housing the second connecting/disconnecting device 34 etc. and is thereby supported rotatably around the second rotation axis C2 in a cantilevered manner. The second ring gear 96 is disposed on the power transmission path between the propeller shaft 30 and the rear wheels 16L, 16R with the second dog clutch 36 engaged.

As shown in FIG. 3, the cylindrical cylinder member 92 has an end portion 92a on the rear wheel 16L side supported by the second casing 98 via a bearing 104 and an end portion 92b on the rear wheel 16R side of the cylinder member 92 supported by a tubular coupling member 106 fitted to inside of the cylinder portion 40a of the differential casing 40c. As a result, the cylinder member 92 is supported rotatably around the second rotation axis C2, i.e., the cylinder member 92 is rotatably supported concentrically with the second ring gear 96. The tubular coupling member 106 is fitted into the inside of the end portion 92b of the cylinder member 92 and the inside of the cylinder portion 40a of the differential casing 40c such that the cylinder member 92 and the cylinder portion 40a of the differential casing 40c are relatively non-rotatable around the second rotation axis C2 and relatively immovable in a second rotation axis C2 direction. As a result, the cylinder member 92 rotates around the second rotation axis C2 during vehicle running. During vehicle running, the cylinder portion 40a of the differential casing 40c also rotates around the second rotation axis C2. The cylindrical cylinder member 92 is provided with first outer circumferential spline teeth 92c formed on an outer circumferential surface of the end portion 92a of the cylinder member 92 on the rear wheel 16L side, second outer circumferential spline teeth 92e formed on an outer circumferential surface of a central portion 92d of the cylinder member 92, and third outer circumferential spline teeth 92f formed on an outer circumferential surface of the end portion 92b of the cylinder member 92 on the rear wheel 16R side.

As shown in FIG. 3, the second dog clutch 36 includes a plurality of second meshing teeth 96b and a cylindrical second movable sleeve (second sleeve) 108. The second meshing teeth 96b are formed on the second ring gear 96. The second movable sleeve 108 is provided with a plurality of second meshing teeth (meshing teeth) 108a that can mesh with the second meshing teeth 96b. The second movable sleeve 108 is provided with inner circumferential meshing teeth 108b meshed with outer circumferential spline teeth 40b formed on the cylinder portion 40a of the differential casing 40c. The inner circumferential meshing teeth 108b make the second movable sleeve 108 relatively non-rotatable around the second rotation axis C2 with respect to the cylinder portion 40a of the differential casing 40c and relatively movable in the second rotation axis C2 direction with respect to the cylinder portion 40a of the differential casing 40c. Therefore, the second movable sleeve 108 has the inner circumferential meshing teeth 108b of the second movable sleeve 108 spline-fitted to the outer circumferential spline teeth 40b of the cylinder portion 40a of the differential casing 40c, and the second movable sleeve 108 is moved in the second rotation axis C2 direction by a second moving device 110 described later so that the second meshing teeth 108a of the second movable sleeve 108 selectively mesh with the second meshing teeth 96b of the second ring gear 96.

As shown in FIG. 3, the second moving device 110 selectively moves the second movable sleeve 108 in the second rotation axis C2 direction to a second meshing position (meshing position) and a second non-meshing position (non-meshing position) to selectively engage the second dog clutch 36. The second meshing position is a position at which the second meshing teeth 108a of the second movable sleeve 108 are meshed with the second meshing teeth 96b of the second ring gear 96. At the second meshing position, the second ring gear 96 and the second movable sleeve 108 cannot relatively rotate, and the second dog clutch 36 is engaged. The second non-meshing position is a position at which the second meshing teeth 108a of the second movable sleeve 108 are not meshed with the second meshing teeth 96b of the second ring gear 96. At the second non-meshing position, the second ring gear 96 and the second movable sleeve 108 can relatively rotate, and the second dog clutch 36 is released.

As shown in FIG. 3, the second moving device 110 includes a second electromagnetic actuator (actuator) 112 and a second ratchet mechanism (ratchet mechanism) 114. The second electromagnetic actuator 112 includes, for example, a second ball cam 116, a second electromagnetic coil 118, a second auxiliary clutch 120, etc. In the second electromagnetic actuator 112, when a second movable piece 122 is attracted by the second electromagnetic coil 118 and a rotation braking torque is generated in an annular second cam member 126 via a second auxiliary clutch 120 while the cylinder member 92 or the cylinder portion 40a of the differential casing 40c is rotating, i.e., during vehicle running, the annular second cam member 126 and an annular first cam member 124 are relatively rotated to move the first cam member 124 in the second rotation axis C2 direction. The second ball cam 116 includes the first cam member 124 and the second cam member 126, as described below. When the first cam member 124 is moved in the second rotation axis C2 direction by the second electromagnetic actuator 112, the second ratchet mechanism 114 retains a movement position of the second movable sleeve 108 moved in the second rotation axis C2 direction due to the movement of the first cam member 124. The second moving device 110 includes a second spring (spring) 128 constantly urging the second movable sleeve 108 from the second non-meshing position toward the second meshing position, i.e., constantly urging the second movable sleeve 108 toward the rear wheel 16L in the second rotation axis C2 direction.

As shown in FIG. 3, the second ratchet mechanism 114 includes an annular first piston 124a, an annular second piston 130, and an annular holder 132 having a plurality of latching teeth, i.e., first latching teeth 132a and second latching teeth 132b, in a circumferential direction. The second ratchet mechanism 114 includes a coil spring 134 disposed in a compressed state between the holder 132 and the first cam member 124 so as to constantly urge the first cam member 124 in the direction toward the second cam member 126. The first piston 124a is reciprocated in the second rotation axis C2 direction with a predetermined stroke by the second ball cam 116 due to the second electromagnetic coil 118 attracting the second movable piece 122 and not attracting the second movable piece 122. Therefore, the first piston 124a is reciprocated in the second rotation axis C2 direction with a predetermined stroke by the operation of the second electromagnetic actuator 112. The second piston 130 moves the second movable sleeve 108 to the second non-meshing position against the urging force of the second spring 128 due to the reciprocation of the first piston 124a in the second rotation axis C2 direction. The holder 132 latches the second piston 130 moved by the first piston 124a with any one of the first latching teeth 132a and the second latching teeth 132b. The first piston 124a is disposed on the cylinder member 92 relatively non-rotatably with respect to the cylinder portion 40a of the differential casing 40c, i.e., the cylinder member 92, and movably in the second rotation axis C2 direction with respect to the cylinder member 92. The second piston 130 is disposed on the cylinder member 92 relatively rotatably with respect to the cylinder member 92 and movably in the second rotation axis C2 direction with respect to the cylinder member 92. The holder 132 is disposed on the cylinder member 92 relatively non-rotatably with respect to the cylinder member 92 and immovably in the second rotation axis C2 direction with respect to the cylinder member 92.

As shown in FIG. 3, the second ball cam 116 includes an annular pair of the first cam member 124 and the second cam member 126, and a plurality of spherical rolling elements 136. The first cam member 124 and the second cam member 126 are inserted in an overlapping manner in the second rotation axis C2 direction between the second piston 130 of the second ratchet mechanism 114 and the bearing 104. The spherical rolling elements 136 are sandwiched between a cam surface 124b formed on the first cam member 124 and a cam surface 126a formed on the second cam member 126. When the first cam member 124 and the second cam member 126 are relatively rotated in the second ball cam 116 configured as described above, the first cam member 124 is separated from the second cam member 126 in the second rotation axis C2 direction. The first cam member 124 is provided with inner circumferential teeth 124c meshed with the first outer circumferential spline teeth 92c formed on the cylinder member 92. The inner circumferential teeth 124c make the first cam member 124 relatively non-rotatable around the second rotation axis C2 with respect to the cylinder member 92 or the cylinder portion 40a of the differential casing 40c and relatively movable in the second rotation axis C2 direction with respect to the cylinder member 92.

As shown in FIG. 3, the second auxiliary clutch 120 includes the second movable piece 122 described above, and a friction plate 138 disposed between the second movable piece 122 and the second electromagnetic coil 118. An inner circumferential portion of the friction plate 138 is provided with inner circumferential teeth 138a engaged with outer circumferential spline teeth 126b formed on an outer circumferential portion of the second cam member 126. The inner circumferential teeth 138a make the friction plate 138 relatively non-rotatable around the second rotation axis C2 with respect to the second cam member 126 and movable in the second rotation axis C2 direction with respect to the second cam member 126.

In the second electromagnetic actuator 112 configured as described above, for example, when a second clutch drive current Ia2 (A) is supplied to the second electromagnetic coil 118 from the electronic control device 100 and the second movable piece 122 is attracted by the second electromagnetic coil 118 while the differential casing 40c i.e. the cylinder member 92 is rotating i.e. during vehicle running, the friction plate 138 of the second auxiliary clutch 120 is clamped due to the second movable piece 122 between the second movable piece 122 and the second electromagnetic coil 118, so that a rotation braking torque is transmitted to the friction plate 138, i.e., to the second cam member 126. Therefore, the first cam member 124 and the second cam member 126 are relatively rotated by the rotation braking torque, and the first piston 124a formed integrally with the first cam member 124 moves toward the rear wheel 16R against the urging forces of the second spring 128 and the coil spring 134 in the second rotation axis C2 direction with respect to the second cam member 126 via the spherical rolling elements 126. When the second clutch drive current Ia2 (A) supplied from the electronic control device 100 to the second electromagnetic coil 118 is reduced and the second movable piece 122 is no longer attracted by the second electromagnetic coil 118, the rotation braking torque is not transmitted to the second cam member 126, and therefore, the second cam member 126 is rotated together with the first cam member 124 via the spherical rolling elements 136 so that the first piston 124a is moved toward the rear wheel 16R by the urging forces of the second spring 128 and the coil spring 134.

When the first piston 124a is reciprocated once in the second rotation axis C2 direction toward the rear wheel 16R and the rear wheel 16L by the second electromagnetic actuator 112 in the second connecting/disconnecting device 34, as shown in FIG. 3, the second movable sleeve 108 is moved via the second ratchet mechanism 114 to the second non-meshing position against the urging force of the second spring 128, and the second piston 130 is latched on the first latching teeth 132a of the holder 132. For example, when the first piston 124a is reciprocated twice by the second electromagnetic actuator 112, i.e., when the first piston 124a is further reciprocated once while the second movable sleeve 108 is at the second non-meshing position in the second connecting/disconnecting device 34, the second piston 130 is unlatched from the first latching teeth 132a of the holder 132, and when the second piston 130 is latched on the second latching teeth 132b of the holder 132, the second movable sleeve 108 is moved to the second meshing position by the urging force of the second spring 128.

As shown in FIG. 3, the second dog clutch 36 includes a synchromesh mechanism 140 arranged in series with the second movable sleeve 108 in the second rotation axis C2 direction to synchronize a rotation speed Nr2 (rpm) of the second ring gear 96 with a rotation speed Nc (rpm) of the differential casing 40c when the second movable sleeve 108 is moved in the second rotation axis C2 direction.

As shown in FIG. 3, the synchromesh mechanism 140 includes a friction engagement member 142 disposed between the second piston 130 of the second ratchet mechanism 114 and the second movable sleeve 108 in the second rotation axis C2 direction, a tapered first friction engagement surface 142a formed on an outer circumferential portion of the friction engagement member 142, a tapered second friction engagement surface 96c formed on an inner circumferential portion of the second ring gear 96 and facing the first friction engagement surface 142a of the friction engagement member 142, and an annular friction member 144 disposed between the first friction engagement surface 142a formed on the friction engagement member 142 and the second friction engagement surface 96c formed on the second ring gear 96. An inner circumferential portion of the friction engagement member 142 is provided with inner circumferential teeth 142b meshed with the third outer circumferential spline teeth 92f formed on the cylinder member 92. The inner circumferential teeth 142b make the friction engagement member 142 relatively non-rotatable around the second rotation axis C2 with respect to the cylinder member 92 and movable in the second rotation axis C2 direction with respect to the cylinder member 92. Furthermore, the friction engagement member 142 is sandwiched between the second movable sleeve 108 and the second piston 130 by the urging force of the second spring 128. Therefore, the friction engagement member 142 is integrally fixed to the second movable sleeve 108 by the urging force of the second spring 128.

In the synchromesh mechanism 140 configured as described above, when the second clutch drive current Ia2 (A) is supplied to the second electromagnetic coil 118 from the electronic control device 100 and the second movable sleeve 108 is moved in the second rotation axis C2 direction, i.e., the second movable sleeve 108 is moved against the urging force of the second spring 128 beyond the second non-meshing position toward the rear wheel 16R, while the second movable sleeve 108 is at the second non-meshing position as shown in FIG. 3 and the cylinder member 92 is rotating around the second rotation axis C2, the first friction engagement surface 142a of the friction engagement member 142 is frictionally engaged with the second friction engagement surface 96c of the second ring gear 96 via the friction member 144. As a result, a torque rotating the cylinder member 92, i.e., a torque rotating the rear wheels 16L, 16R, is transmitted to the second ring gear 96, so that the rotation speed Nr2 of the second ring gear 96 is increased until reaching a rotation speed of the cylinder member 92, i.e., the rotation speed Nc of the differential casing 40c. When the second clutch drive current Ia2 (A) supplied from the electronic control device 100 to the second electromagnetic coil 118 is reduced, the second movable sleeve 108 is moved toward the rear wheel 16L by the urging force of the second spring 128, and the second meshing teeth 108a of the second movable sleeve 108 are meshed with the second meshing teeth 96b of the second ring gear 96. The second movable sleeve 108 indicated by a dashed-dotted line in FIG. 3 is the second movable sleeve 108 when the second movable sleeve 108 is moved against the urging force of the second spring 128 beyond the second non-meshing position toward the rear wheel 16R.

As shown in FIG. 1, a control coupling (coupling) 146 is disposed on a power transmission path between the propeller shaft 30 and the second ring gear 96. The control coupling 146 includes a clutch drum 146a coupled to the propeller shaft 30 in a power transmittable manner, and a clutch hub 146b coupled to the drive pinion 94, i.e., the second ring gear 96, in a power transmittable manner, so that the control coupling 146 controls a transmission torque from the propeller shaft 30 to the second ring gear 96, i.e., a transmission torque from the engine 12 to the rear wheels 16L, 16R, with the first dog clutch 26 and the second dog clutch 36 each engaged. Although not shown, the control coupling 146 is, for example, an electromagnetic coupling including an electrically controlled actuator that includes an electromagnetic coil and a ball cam and a wet multiplate clutch that has a friction force, i.e., a fastening force, between an input-side friction member (not shown) disposed on the clutch drum 146a and an output-side friction member (not shown) disposed on the clutch hub 146b adjusted by the actuator, so that a magnetic force generated by a coupling command current Icp supplied from the electronic control device 100 to the electromagnetic coil increases the fastening force between the input-side friction member and the output-side friction member, i.e., increases an engagement torque of the control coupling 146, so as to adjust the transmission torque transmitted to the rear wheels 16L, 16R.

In the four-wheel drive vehicle 10 configured as described above, when a two-wheel drive mode, i.e., a disconnect mode, is selected by the electronic control device 100, for example, the first dog clutch 26, the second dog clutch 36, and the control coupling 146 are respectively released to form the two-wheel drive state in which the drive power is transmitted from the engine 12 via the front-wheel drive power distributing device 20 to the front wheels 14L, 14R. In the two-wheel drive state, the first dog clutch 26 and the second dog clutch 36 are each released to form a disconnect state in which the propeller shaft 30 interrupts the power transmission from the engine 12 and the rear wheels 16L, 16R. In the four-wheel drive vehicle 10, when a four-wheel drive mode, i.e., a connect mode, is selected by the electronic control device 100, the first dog clutch 26, the second dog clutch 36, and the control coupling 146 are respectively engaged to form the four-wheel drive state in which the drive power is transmitted from the engine 12 via the front-wheel drive power distributing device 20 to the front wheels 14L, 14R while the drive power is also transmitted from the engine 12 via the propeller shaft 30 etc. to the rear wheels 16L, 16R.

As shown in FIG. 1, the electronic control device 100 is configured to include a so-called microcomputer including a CPU, a RAM, a ROM, and an I/O interface, for example, and the CPU executes signal processes in accordance with a program stored in advance in the ROM, while utilizing a temporary storage function of the RAM, to provide various controls of the four-wheel drive vehicle 10. The electronic control device 100 is supplied with various input signals detected by sensors disposed on the four-wheel drive vehicle 10. For example, the signals input to the electronic control device 100 include: an ON/OFF signal indicative of whether the first dog clutch 26 is in the engaged state, i.e., an ON/OFF signal indicative of whether the first movable sleeve 54 is at the first meshing position, detected by a first position sensor 150; an ON/OFF signal indicative of whether the second dog clutch 36 is in the engaged state, i.e., an ON/OFF signal indicative of whether the second movable sleeve 108 is at the second meshing position, detected by a second position sensor 152; signals indicative of wheel speeds W (rpm), i.e., wheel speeds Wfl, Wfr, Wrl, Wrr (rpm) of the front wheels 14L, 14R and the rear wheels 16L, 16R, detected by a wheel speed sensor 154; and a signal indicative of the rotation speed Nr2 (rpm) of the second ring gear 96 detected by a rotation speed sensor 156.

Various output signals are supplied from the electronic control device 100 to devices disposed on the four-wheel drive vehicle 10. For example, the signals supplied from the electronic control device 100 to the portions include: the first clutch drive current Ia1 (A) supplied to the first electromagnetic coil 64 of the first electromagnetic actuator 58 for controlling the first dog clutch 26, i.e., for switching the first dog clutch 26 to the engaged state or a released state; the second clutch drive current Ia2 (A) supplied to the second electromagnetic coil 118 of the second electromagnetic actuator 112 for controlling the second dog clutch 36, i.e., for switching the second dog clutch 36 to the engaged state or a released state; and the coupling command current Icp (A) supplied to the actuator (not shown) disposed in the control coupling 146 for controlling the control coupling 146, i.e., for controlling the transmission torque transmitted from the engine 12 to the rear wheels 16L, 16R during four-wheel drive running.

As shown in FIG. 1, the electronic control device 100 includes, for example, a mode switching portion 160, a coupling control portion 162, a second clutch control portion 164, a synchronization determining portion 166, and a first clutch control portion 168. The mode switching portion 160 shown in FIG. 1 switches between a two-wheel drive mode and a four-wheel drive mode depending on a running state of the four-wheel drive vehicle 10. The mode switching portion 160 includes a switching condition satisfaction determining portion 160a.

The switching condition satisfaction determining portion 160a determines whether a switching condition for switching from the two-wheel drive mode to the four-wheel drive mode, i.e., a condition for canceling the disconnect state, is satisfied during vehicle running. For example, the switching condition satisfaction determining portion 160a determines that the condition for canceling the disconnect state is satisfied when the running state of the four-wheel drive vehicle 10 satisfies any of four-wheel drive start conditions due to vehicle start running, wheel slip, understeer, turning, acceleration running, high-load running, and deceleration running, or the like. The mode switching portion 160 switches from the four-wheel drive mode to the two-wheel drive mode when the switching condition satisfaction determining portion 160a determines that a condition for canceling a connect state is satisfied.

When the switching condition satisfaction determining portion 160a determines that the condition for canceling the disconnect state is satisfied, the coupling control portion 162 controls the coupling command current Icp (A) supplied to the control coupling 146, i.e., a coupling torque Tcp (Nm) that is a command value of the engagement torque of the control coupling 146, from 0 (Nm) to a preset first torque Tcp1 (Nm). The first torque Tcp1 is the engagement torque of the control coupling 146 enabling direct coupling of the control coupling 146 such that the rotation speed Nr2 of the second ring gear 96 and the rotation speed Nr1 of the first ring gear 46 become equal when the rotation speed Nr2 of the second ring gear 96 is increased due to operation of the synchromesh mechanism 140 from the state in which the rotation of the second ring gear 96 is stopped, for example. The phrase "enabling direct coupling of the control coupling" means that the clutch drum 146a and the clutch hub 146b are enabled to integrally rotate in the control coupling 146.

When the switching condition satisfaction determining portion 160a determines that the condition for canceling the disconnect state is satisfied and a predetermined time period tc (see FIG. 5) elapses from the determination, the second clutch control portion 164 supplies the second clutch drive current Ia2 (A) to the second electromagnetic coil 118 of the second electromagnetic actuator 112 so as to operate the synchromesh mechanism 140. By supplying the second clutch drive current Ia2 (A) to the second electromagnetic coil 118, the second movable piece 122 is attracted by the second electromagnetic coil 118, and the rotation braking torque is transmitted to the second cam member 126 of the second ball cam 116. As a result, the first cam member 124 and the second cam member 126 relatively rotate, and the first piston 124a formed integrally with the first cam member 124 moves the second movable sleeve 108 via the second piston 130 against the urging force of the second spring 128 beyond the second non-meshing position toward the rear wheel 16R. Thus, the synchromesh mechanism 140 is operated, and the rotation speed Nr2 of the second ring gear 96 increases to the rotation speed Nc of the differential casing 40c.

When the switching condition satisfaction determining portion 160a determines that the condition for canceling the disconnect state is satisfied, the synchronization determining portion 166 determines whether the rotation speed Nr2 (rpm) of the second ring gear 96 is synchronized with the rotation speed Nc (rpm) of the differential casing 40c. For example, when a difference Ns (Nc−Nr2) between the rotation speed Nc of the differential casing 40c and the rotation speed Nr2 of the second ring gear 96 becomes within a predetermined rotation speed difference Ns1 (Ns≤Ns1), the synchronization determining portion 166 determines that the rotation speed Nr2 of the second ring gear 96 is synchronized with the rotation speed Nc of the differential casing 40c. The rotation speed Nr2 of the second ring gear 96 is detected from the rotation speed sensor 156. The rotation speed Nc of the differential casing 40c is an average value ((Wrl+Wrr)/2) of the wheel speed Wrl (rpm) of the rear wheel 16L and the wheel speed Wrr (rpm) of the rear wheel 16R detected from the wheel speed sensor 154.

When the switching condition satisfaction determining portion 160a determines that the condition for canceling the disconnect state is satisfied and the predetermined time period tc (see FIG. 5) elapses from the determination, the first clutch control portion 168 supplies the first clutch drive current Ia1 (A) to the first electromagnetic coil 64 of the first electromagnetic actuator 58 so as to engage the first dog clutch 26. By supplying the first clutch drive current Ia1 (A) to the first electromagnetic coil 64, the first movable piece 68 is attracted by the first electromagnetic coil 64, and the rotation braking torque is transmitted to the first cam member 70 of the first ball cam 62. As a result, the first cam member 70 and the second cam member 72 relatively rotate, and the first piston 70a formed integrally with the first cam member 70 moves the first movable sleeve 54 via the second piston 76 against the urging force of the first spring 74 beyond the first non-meshing position toward the front wheel 14L.

As shown in FIG. 1, the first clutch control portion 168 includes an engagement determining portion 168a. When the switching condition satisfaction determining portion 160a determines that the condition for canceling the disconnect state is satisfied, the engagement determining portion 168a determines whether the first dog clutch 26 is engaged. When the first position sensor 150 detects that the first movable sleeve 54 is at the first meshing position, the engagement determining portion 168a determines that the first dog clutch 26 is engaged.

When the synchronization determining portion 166 determines that the rotation speed Nr2 of the second ring gear 96 is synchronized with the rotation speed Nc of the differential casing 40c, the first clutch control portion 168 reduces the first clutch drive current Ia1 supplied to the first electromagnetic coil 64 to stop the supply of the first clutch drive current Ia1. When the first clutch drive current Ia1 supplied to the first electromagnetic coil 64 is reduced, the first movable piece 68 is no longer attracted by the first electromagnetic coil 64, and the first movable sleeve 54 is moved by the urging force of the first spring 74 to the first meshing position.

When the engagement determining portion 168a determines that the first dog clutch 26 is engaged, the second clutch control portion 164 reduces the second clutch drive current Ia2 supplied to the second electromagnetic coil 118 to stop the supply of the second clutch drive current Ia2. When the second clutch drive current Ia2 supplied to the second electromagnetic coil 118 is reduced, the second movable piece 122 is no longer attracted by the second electromagnetic coil 118, and the second movable sleeve 108 is moved by the urging force of the second spring 128 to the second meshing position.

When the engagement determining portion 168a determines that the first dog clutch 26 is engaged, the coupling control portion 162 controls the coupling torque Tcp such that the coupling torque Tcp decreases from the first torque Tcp1 to a preset second torque Tcp2 (Nm). The second torque Tcp2 is an engagement torque of the control coupling 146 with which the rotation speed Nr2 of the second ring gear 96 is prevented from decreasing from the rotation speed Nr1 of the first ring gear 46, i.e., with which the rotation of the second ring gear 96 is prevented from stopping, due to rotation resistance of the rotating members, for example, the second ring gear 96, the drive pinion 94, and the clutch hub 146b, while the first dog clutch 26 is engaged during vehicle running. The second torque Tcp2 is smaller than the first torque Tcp1 and larger than zero (Tcp1>Tcp2>0). When a predetermined time has elapsed after engagement of the second dog clutch 36, the coupling control portion 162 controls the coupling torque Tcp such that, for example, a torque distribution ratio γt of drive torques distributed to the front wheels 14L, 14R and the rear wheels 16L, 16R becomes equal to a target front/rear wheel shared load ratio γg calculated from an acceleration G (m/s$^2$) in a vehicle longitudinal direction detected by a longitudinal acceleration sensor and a road surface gradient θr detected by a road surface gradient sensor.

Figure 4:
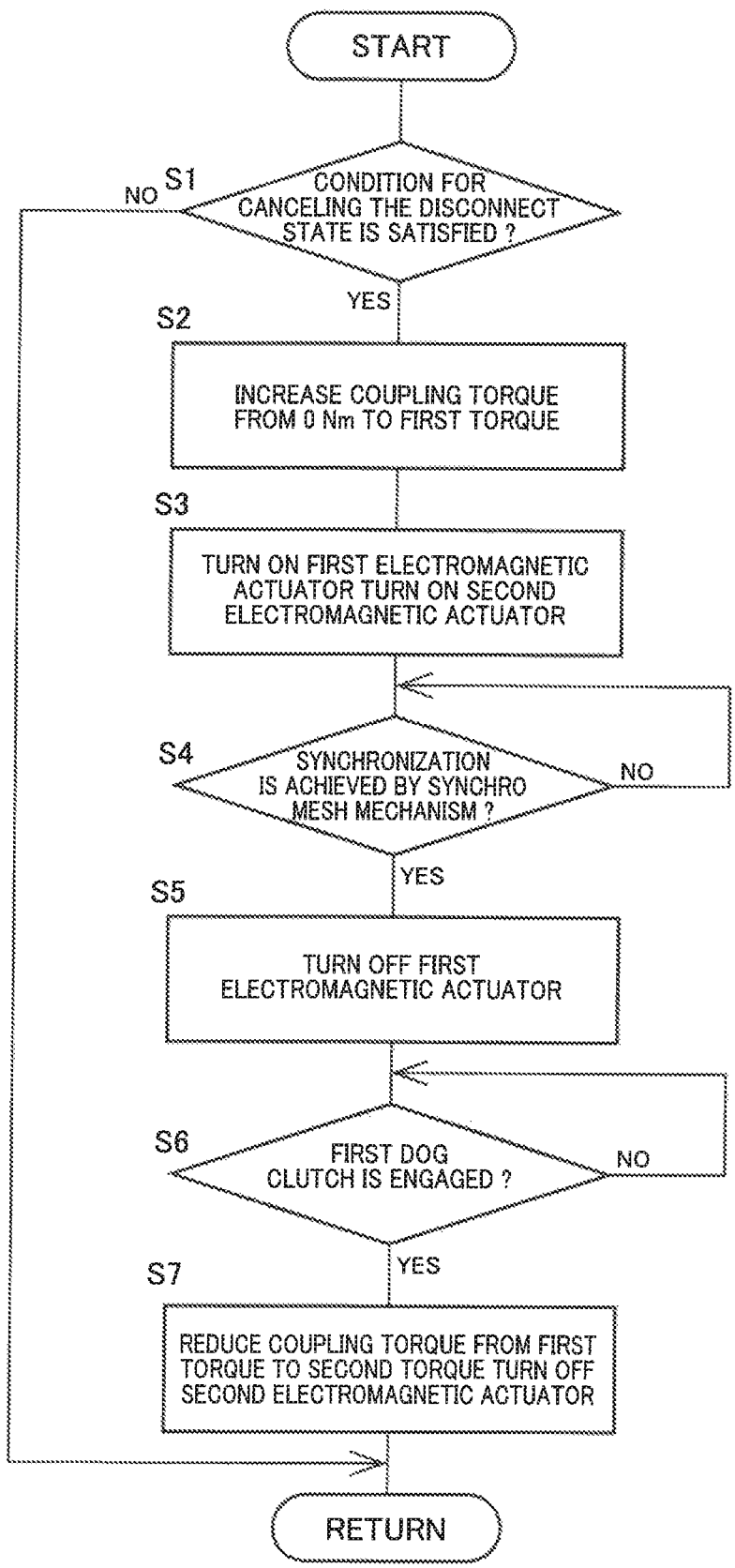
FIG. 4 is a flow chart for explaining an example of a control operation in an electronic control device in FIG. 1 of an engagement control of engaging each of a first dog clutch, a second dog clutch, and a control coupling, from a disconnect state at the time of disconnect cancelation for canceling the disconnect state, where the first dog clutch and the second dog clutch are each released to allow a propeller shaft to interrupt power transmission from an engine and rear wheels.
Figure 5:
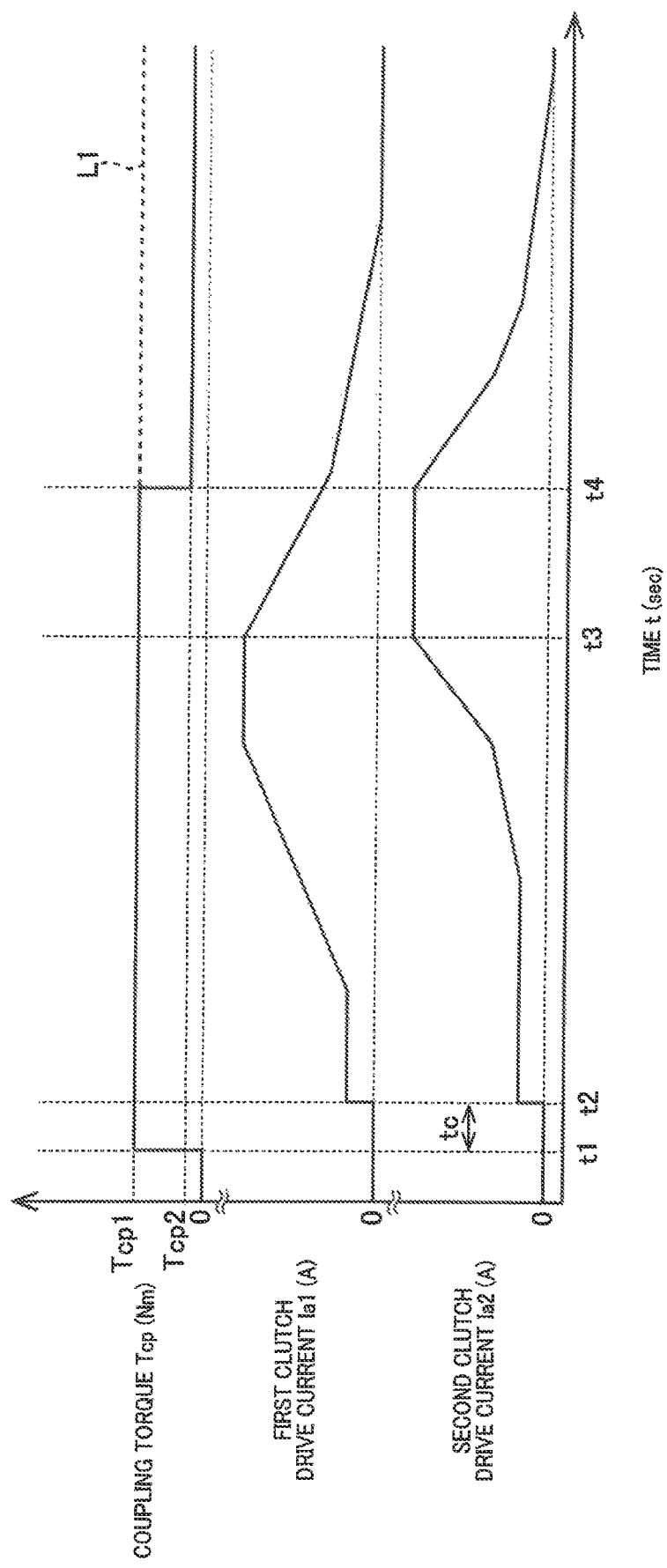
FIG. 5 is a time chart when the control operation shown in the flow chart of FIG. 4 is performed.

FIG. 4 is a flow chart for explaining an example of a control operation in the electronic control device 100 of an engagement control of engaging each of the first dog clutch 26, the second dog clutch 36, and the control coupling 146, from a disconnect state at the time of disconnect cancelation for cancelling the disconnect state, where the first dog clutch 26 and the second dog clutch 36 are each released to allow the propeller shaft 30 to interrupt the power transmission from the engine 12 and the rear wheels 16L, 16R. FIG. 5 is a time chart when the control operation shown in the flow chart of FIG. 4 is performed.

At step (hereinafter, step will be omitted) S1 corresponding to the function of the switching condition satisfaction determining portion 160a, it is determined whether the condition for canceling the disconnect state is satisfied. If the determination of S1 is negative, S1 is executed again, and if the determination of S1 is affirmative (at time t1 of FIG. 5), S2 corresponding to the function of the coupling control portion 162 is executed. At S2, the coupling torque Tcp (Nm) is controlled from 0 (Nm) to the first torque Tcp1 (Nm). Subsequently, if the determination of S1 is affirmative and the predetermined time period tc elapses (at time t2 of FIG. 5), S3 corresponding to the functions of the first clutch control portion 168 and the second clutch control portion 164 is executed. At S3, the first clutch drive current Ia1 (A) is supplied to the first electromagnetic coil 64 of the first electromagnetic actuator 58 to turn the first electromagnetic actuator 58 on, and the second clutch drive current Ia2 (A) is supplied to the second electromagnetic coil 118 of the second electromagnetic actuator 112 to turn the second electromagnetic actuator 112 on.

Subsequently, at S4 corresponding to the function of the synchronization determining portion 166, it is determined whether the rotation speed Nr2 (rpm) of the second ring gear 96 is synchronized with the rotation speed Nc (rpm) of the differential casing 40c. If the determination of S4 is negative, S4 is executed again, and if the determination of S4 is affirmative (at time t3 of FIG. 5), S5 corresponding to the function of the first clutch control portion 168 is executed.

At S5, the first clutch drive current Ia1 supplied to the first electromagnetic coil 64 is reduced to stop the supply of the first clutch drive current Ia1, so that the operation of the first electromagnetic actuator 58 is stopped.

Subsequently, at S6 corresponding to the function of the engagement determining portion 168a, it is determined whether the first dog clutch 26 is engaged. If the determination of S6 is negative, S6 is executed again, and if the determination of S6 is affirmative (at time t4 of FIG. 5), S7 corresponding to the functions of the coupling control portion 162 and the second clutch control portion 164 is executed. At S7, the coupling torque Tcp (Nm) is controlled from the first torque Tcp1 (Nm) to the second torque Tcp2 (Nm), and the second clutch drive current Ia2 supplied to the second electromagnetic coil 118 is reduced to stop the supply of the second clutch drive current Ia2, so that the operation of second electromagnetic actuator 112 is stopped.

In FIG. 5, a broken line L1 shows a comparative example in which the coupling torque Tcp (Nm) is maintained at the first torque Tcp1 (Nm) even when the determination of S6 is affirmative (at time t4 of FIG. 5). In this example, if the determination of S6 is affirmative, the coupling torque Tcp (Nm) is controlled to the second torque Tcp2 (Nm) smaller than the first torque Tcp1 (Nm). Therefore, even when a load acting on the second movable sleeve 108 is made smaller as compared to the comparative example at the time of engagement of the second dog clutch 36, i.e., even when a spring load of the second spring 128 urging the second movable sleeve 108 from the second non-meshing position toward the second meshing position is made smaller as compared to the comparative example, the second meshing teeth 108a of the second movable sleeve 108 mesh with the second meshing teeth 96b formed on the second ring gear 96.

As described above, according to the four-wheel drive vehicle 10 of this example, in the case of canceling the disconnect state in which the propeller shaft 30 interrupts the power transmission from the engine 12 and the rear wheels 16L, 16R, the electronic control device 100 controls the coupling torque Tcp of the control coupling 146 to the preset first torque Tcp1 and operates the synchromesh mechanism 140 to engage the first dog clutch 26 when it is determined that the rotation speeds are synchronized between the cylinder portion 40a of the differential casing 40c and the second ring gear 96, and to control the coupling torque Tcp of the control coupling 146 to the second torque Tcp2 smaller than the first torque Tcp1 to engage the second dog clutch 36 when it is determined that the first dog clutch 26 is engaged. Therefore, when the second dog clutch 36 is engaged, even if the load acting on the second movable sleeve 108 is reduced at the time of engagement of the second dog clutch 36, the second meshing teeth 108a of the second movable sleeve 108 mesh with the second meshing teeth 96b of the second ring gear 96. As a result, the load acting on the second movable sleeve 108 can suitably be reduced at the time of engagement of the second dog clutch 36, and the deterioration of the NV performance can be suppressed.

According to the four-wheel drive vehicle 10 of this example, the first torque Tcp1 is the torque enabling direct coupling of the control coupling 146 such that the rotation speed Nr1 of the first ring gear 46 and the rotation speed Nr2 of the second ring gear 96 become equal when the synchromesh mechanism 140 is operating. Therefore, when the rotation speeds are synchronized between the cylinder portion 40a of the differential casing 40c and the second ring gear 96, the rotation speeds are suitably synchronized between the input shaft 42 and the first ring gear 46, so that even if the first dog clutch 26 is engaged immediately after the electronic control device 100 determines that the synchronization of the rotation speeds between the cylinder portion 40a of the differential casing 40c and the second ring gear 96 is completed, the first meshing teeth 54a of the first movable sleeve 54 suitably mesh with the first meshing teeth 46c of the first ring gear 46.

According to the four-wheel drive vehicle 10 of this example, the second movable sleeve 108 has the second meshing teeth 108a that can mesh with the second meshing teeth 96b formed on the second ring gear 96 and is disposed relatively non-rotatably with respect to the differential casing 40c and movably in the second rotation axis C2 direction with respect to the differential casing 40c, and the vehicle includes: the second spring 128 urging the second movable sleeve 108 from the second non-meshing position at which the meshing is released between the second meshing teeth 108a and the second meshing teeth 96b to the second meshing position at which the second meshing teeth 108a are meshed with the second meshing teeth 96b; the second electromagnetic actuator 112; and the second ratchet mechanism 114 that includes the first piston 124a reciprocated in the second rotation axis C2 direction by the operation of the second electromagnetic actuator 112, the second piston 130 moving the second movable sleeve 108 to the second non-meshing position against the urging force of the second spring 128 in accordance with the first piston 124a, and the holder 132 having the first latching teeth 132a and the second latching teeth 132b and latching the second piston 130 moved by the first piston 124a with one of the first latching teeth 132a and the second latching teeth 132b and that moves the second movable sleeve 108 between the second non-meshing position and the second meshing position depending on whether the second piston 130 is latched with the first latching teeth 132a or the second latching teeth 132b respectively. Therefore, even if the spring load urging the second movable sleeve 108 from the second non-meshing position toward the second meshing position is suitably reduced in the second spring 128, the second movable sleeve 108 can be moved from the second non-meshing position to the second meshing position by the urging force of the second spring 128.

According to the four-wheel drive vehicle 10 of this example, the second torque Tcp2 is larger than zero. Therefore, when the second dog clutch 36 is engaged, the rotation speed Nr2 of the second ring gear 96 is preferably prevented from decreasing due to the rotation resistance etc. of the second ring gear 96.

According to the four-wheel drive vehicle 10 of this example, the main drive wheels are the front wheels 14L, 14R, and the sub-drive wheels are the rear wheels 16L, 16R. Therefore, the present invention can suitably be applied to an FF-based (front-engine/front-drive-based) four-wheel drive vehicle.

Another example of the present invention will be described in detail with reference to the drawings. In the following description, the portions common to the examples are denoted by the same reference numerals and will not be described.

SECOND EXAMPLE

Figure 6:
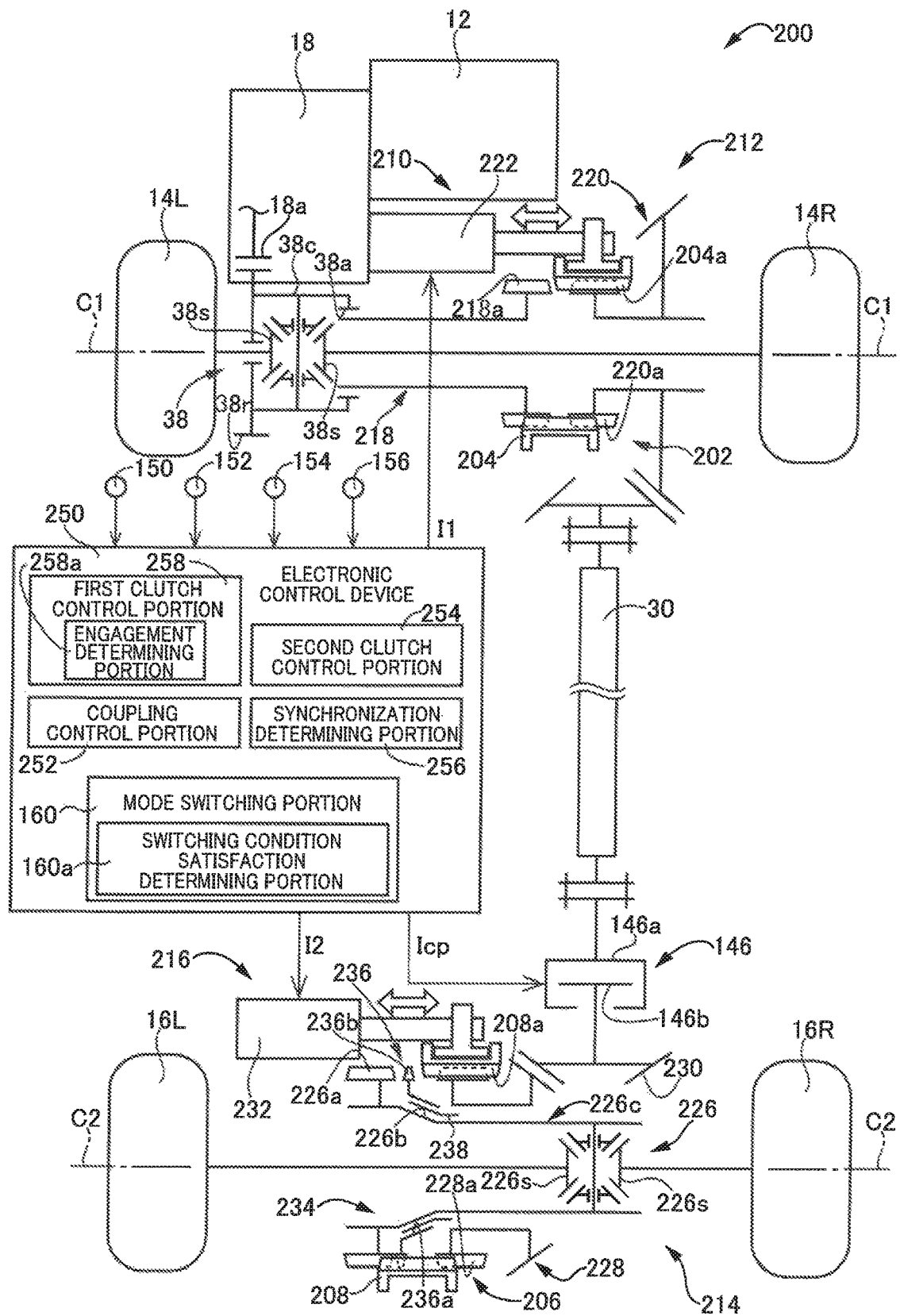
FIG. 6 is a diagram for explaining a four-wheel drive vehicle according to another example of the present invention.

FIG. 6 is a diagram for explaining a four-wheel drive vehicle 200 according to another example of the present invention. The four-wheel drive vehicle 200 according to this example is substantially the same as the four-wheel drive vehicle 10 of the first example except that a first dog clutch 202 is engaged by moving a first movable sleeve (first sleeve) 204 in one direction and that a second dog clutch 206 is engaged by moving a second movable sleeve (second sleeve) 208 in one direction.

When the four-wheel drive vehicle 200 is in the two-wheel drive state, the drive power transmitted from the engine 12 via the automatic transmission 18 is transmitted through the front-wheel drive power distributing device 20 to the front wheels 14L, 14R. In this two-wheel drive state, at least the first dog clutch 202 of a first connecting/disconnecting device 210 is released, and the drive power is not transmitted from the engine 12 to a transfer 212, the propeller shaft 30, a rear-wheel drive power distributing device 214, and the rear wheels 16L, 16R. However, when the four-wheel drive vehicle 200 is in the four-wheel drive state, both the first dog clutch 202 and the second dog clutch 206 of a second connecting/disconnecting device 216 are engaged, and the drive power is transmitted from the engine 12 to the transfer 212, the propeller shaft 30, the rear-wheel drive power distributing device 214, and the rear wheels 16L, 16R.

The transfer 212 includes a cylindrical input shaft (first input rotating member) 218 rotatably supported around the first rotation axis C1 and having a portion of the drive power from the engine 12 toward the front wheels 14L, 14R input thereto, a cylindrical first ring gear (first output rotating member) 220 rotatably supported around the first rotation axis C1, and the first connecting/disconnecting device 210 selectively disconnecting or connecting a power transmission path between the input shaft 218 and the first ring gear 220. The first ring gear 220 is coupled to the rear wheels 16L, 16R via the propeller shaft 30 in a power transmittable manner with the second dog clutch 206 and the control coupling 146 each engaged.

The first connecting/disconnecting device 210 includes a third actuator 222 moving the first movable sleeve 204 in the first rotation axis C1 direction to move the first movable sleeve 204 to a third meshing position at which the first dog clutch 202 is engaged and a third non-meshing position at which the first dog clutch 202 is released. The third meshing position is a position at which first meshing teeth 204a formed on the first movable sleeve 204 are meshed with first meshing teeth 218a formed on the input shaft 218, and the third non-meshing position is a position at which the first meshing teeth 204a formed on the first movable sleeve 204 are not meshed with the first meshing teeth 218a formed on the input shaft 218. The first meshing teeth 204a of the first movable sleeve 204 are constantly meshed with outer circumferential spline teeth 220a formed on the first ring gear 220, and the first movable sleeve 204 is disposed on the first ring gear 220 relatively non-rotatably with respect to the first ring gear 220 and movably in the first rotation axis C1 direction with respect to the first ring gear 220. Therefore, the first movable sleeve 204 is spline-fitted to the outer circumferential spline teeth 220a of the first ring gear 220 and moved in the first rotation axis C1 direction by the third actuator 222 to selectively mesh with the first meshing teeth 218a of the input shaft 218. Although not shown, the third actuator 222 includes an electric motor and a conversion mechanism such as a screw mechanism converting the rotation of the electric motor into a motion of the first movable sleeve 204 in the first rotation axis C1 direction and moves the first movable sleeve 204 between the third meshing position and the third non-meshing position in accordance with a first drive current I1 (A) supplied from an electronic control device (control device) 250 to the electric motor.

As shown in FIG. 6, the rear-wheel drive power distributing device 214 includes a second differential device 226 rotatably around the second rotation axis C2. The second differential device 226 includes a differential casing (second input rotating member) 226c rotatably supported around the second rotation axis C2, and a pair of side gears 226s assembled inside the differential casing 226c. The differential casing 226c is disposed on the power transmission path between the propeller shaft 30 and the rear wheels 16L, 16R with the second dog clutch 206 and the control coupling 146 engaged, and the differential casing 226c is coupled to the rear wheels 16L, 16R in a power transmittable manner with the second dog clutch 206 released.

As shown in FIG. 6, the rear-wheel drive power distributing device 214 includes a second ring gear 228 that is meshed with a drive pinion 230 coupled to an end portion of the propeller shaft 30 on the side of the rear wheels 16L, 16R and that is supported rotatably around the second rotation axis C2, and the second connecting/disconnecting device 216 selectively disconnecting or connecting a power transmission path between the differential casing 226c of the second differential device 226 and the second ring gear 228. The second ring gear 228 is disposed on the power transmission path between the propeller shaft 30 and the rear wheels 16L, 16R with the second dog clutch 206 and the control coupling 146 engaged. The control coupling 146 is disposed on a power transmission path between the propeller shaft 30 and the second ring gear 228.

The second connecting/disconnecting device 216 includes a fourth actuator 232 moving the second movable sleeve 208 in the second rotation axis C2 direction to move the second movable sleeve 208 to a fourth meshing position at which the second dog clutch 206 is engaged and a fourth non-meshing position at which the second dog clutch 206 is released. The fourth meshing position is a position at which second meshing teeth (meshing teeth) 208a formed on the second movable sleeve 208 are meshed with second meshing teeth 226a formed on the differential casing 226c, and the fourth non-meshing position is a position at which the second meshing teeth 208a formed on the second movable sleeve 208 are not meshed with the second meshing teeth 226a formed on the differential casing 226c. The second meshing teeth 208a of the second movable sleeve 208 are constantly meshed with outer circumferential spline teeth 228a formed on the second ring gear 228, and the second movable sleeve 208 is disposed on the second ring gear 228 relatively non-rotatably with respect to the second ring gear 228 and movably in the second rotation axis C2 direction with respect to the second ring gear 228. Therefore, the second movable sleeve 208 is spline-fitted to the outer circumferential spline teeth 228a of the second ring gear 228 and moved in the second rotation axis C2 direction by the fourth actuator 232 to selectively mesh with the second meshing teeth 226a of the differential casing 226c. Although not shown, the fourth actuator 232 includes an electric motor and a conversion mechanism such as a screw mechanism converting the rotation of the electric motor into a motion of the second movable sleeve 208 in the second rotation axis C2 direction and moves the second movable sleeve 208 between the fourth meshing position and the fourth non-meshing position in accordance with a second drive current I2 (A) supplied from the electronic control device 250 to the electric motor.

As shown in FIG. 6, the second dog clutch 206 includes a synchromesh mechanism 234 arranged in series with the second movable sleeve 208 in the second rotation axis C2 direction to synchronize rotation speeds between the differentia casing 226c and the second ring gear 228 when the second movable sleeve 208 is moved in the second rotation axis C2 direction.

As shown in FIG. 6, the synchromesh mechanism 234 includes a conical outer circumferential friction surface 226b formed on a portion of an outer circumferential surface of the differential casing 226c, an annular synchronizer ring 236 formed between the second meshing teeth 226a of the differential casing 226c and the outer circumferential spline teeth 228a of the second ring gear 228, and an annular friction ring 238 disposed between a conical inner circumferential friction surface 236a formed on the synchronizer ring 236 and a conical outer circumferential friction surface 226b of the differential casing 226c. An outer circumferential surface of the synchronizer ring 236 is provided with outer circumferential spline teeth 236b that can mesh with the second meshing teeth 208a relatively non-rotatably with respect to the second meshing teeth 208a of the second movable sleeve 208 and movably in the second rotation axis C2 direction with respect to the second meshing teeth 208a of the second movable sleeve 208.

In the synchromesh mechanism 234, when the second movable sleeve 208 is moved by the fourth actuator 232 from the fourth non-meshing position to the fourth meshing position, the second movable sleeve 208 comes into contact with the outer circumferential spline teeth 236b of the synchronizer ring 236, which causes sliding contact between the conical inner circumferential friction surface 236a of the synchronizer ring 236 and the friction ring 238 and between the friction ring 238 and the conical outer circumferential friction surface 226b of the differential casing 226c, and a rotation speed Nr2a of the second movable sleeve 208, i.e., the second ring gear 228, is raised toward a rotation speed Nca of the differential casing 226c. When the rotation speed Nca of the differential casing 226c is synchronized with the rotation speed Nr2a of the second ring gear 228, the second meshing teeth 208a of the second movable sleeve 208 move along the outer circumferential spline teeth 236b of the synchronizer ring 236, and the second meshing teeth 208a of the second movable sleeve 208 mesh with the second meshing teeth 226a of the differential casing 226c.

As shown in FIG. 6, when the switching condition satisfaction determining portion 160a determines that the condition for canceling the disconnect state is satisfied, a coupling control portion 252 controls the coupling torque Tcp (Nm) such that the coupling torque Tcp (Nm) becomes equal to a preset first torque Tcp1a (Nm) from 0 (Nm). The first torque Tcp1a is the engagement torque of the control coupling 146 enabling direct coupling of the control coupling 146 such that the rotation speed Nr2a of the second ring gear 228 and a rotation speed Nr1a of the first ring gear 220 become equal when the rotation speed Nr2a of the second ring gear 228 is increased due to operation of the synchromesh mechanism 234 from the state in which the rotation of the second ring gear 228 is stopped, for example.

When the switching condition satisfaction determining portion 160a determines that the condition for canceling the disconnect state is satisfied and the predetermined time period tc elapses from the determination, a second clutch control portion 254 supplies the second drive current I2 (A) to the electric motor of the fourth actuator 232 so as to operate the synchromesh mechanism 234. When the second movable sleeve 208 is moved from the fourth non-meshing position to the fourth meshing position by the supply of the second drive current I2, the synchromesh mechanism 234 is operated, and the rotation speed Nr2a of the second ring gear 228 is increased to the rotation speed Nca of the differential casing 226c.

When the switching condition satisfaction determining portion 160a determines that the condition for canceling the disconnect state is satisfied, a synchronization determining portion 256 determines whether the rotation speed Nr2a of the second ring gear 228 is synchronized with the rotation speed Nca of the differential casing 226c. For example, when a difference Nsa (Nca−Nr2a) between the rotation speed Nca of the differential casing 226c and the rotation speed Nr2a of the second ring gear 228 becomes within a predetermined rotation speed difference Ns1a (Nsa≤Ns1a), the synchronization determining portion 256 determines that the rotation speed Nr2a of the second ring gear 228 is synchronized with the rotation speed Nca of the differential casing 226c. The rotation speed Nr2a of the second ring gear 228 is detected from the rotation speed sensor 156. The rotation speed Nca of the differential casing 226c is an average value ((Wrl+Wrr)/2) of the wheel speed Wrl (rpm) of the rear wheel 16L and the wheel speed Wrr (rpm) of the rear wheel 16R detected from the wheel speed sensor 154.

When the synchronization determining portion 256 determines that the rotation speed Nr2a of the second ring gear 228 is synchronized with the rotation speed Nca of the differential casing 226c, a first clutch control portion 258 supplies the first drive current I1 (A) to the electric motor of the third actuator 222 such that the first movable sleeve 204 moves from the third non-meshing position to the third meshing position. The first clutch control portion 258 includes an engagement determining portion 258a. When the switching condition satisfaction determining portion 160a determines that the condition for canceling the disconnect state is satisfied, the engagement determining portion 258a determines whether the first dog clutch 202 is engaged. For example, when it is detected by the first position sensor 150 that the first movable sleeve 204 is at the third meshing position, the engagement determining portion 258a determines that the first dog clutch 202 is engaged.

When the engagement determining portion 258a determines that the first dog clutch 202 is engaged, the second clutch control portion 254 supplies the second drive current I2 (A) to the electric motor of the fourth actuator 232 such that the second movable sleeve 208 moves to the fourth meshing position.

When the engagement determining portion 258a determines that the first dog clutch 202 is engaged, the coupling control portion 252 controls the coupling torque Tcp such that the coupling torque Tcp decreases from the first torque Tcp1a to a preset second torque Tcp2a (Nm). The second torque Tcp2a is an engagement torque of the control coupling 146 with which the rotation speed Nr2a of the second ring gear 228 is prevented from decreasing from the rotation speed Nr1a of the first ring gear 220, i.e., with which the rotation of the second ring gear 228 is prevented from stopping, due to rotation resistance of the rotating members, for example, the second ring gear 228, the drive pinion 230, and the clutch hub 146b, while the first dog clutch 202 is engaged during vehicle running. The second torque Tcp2a is smaller than the first torque Tcp1a and larger than zero (Tcp1a>Tcp2a>0). When a predetermined time has elapsed after engagement of the second dog clutch 206, the coupling control portion 252 controls the coupling torque Tcp such that the torque distribution ratio γt becomes equal to the target front/rear wheel shared load ratio γg.

As described above, according to the four-wheel drive vehicle 200 of this example, in the case of canceling the disconnect state in which the propeller shaft 30 interrupts the power transmission from the engine 12 and the rear wheels 16L, 16R, the electronic control device 250 controls the coupling torque Tcp of the control coupling 146 to the preset first torque Tcp1a and operates the synchromesh mechanism 234 to engage the first dog clutch 202 when it is determined that the rotation speeds are synchronized between the differential casing 226c and the second ring gear 228, and to control the coupling torque Tcp of the control coupling 146 to the second torque Tcp2a smaller than the first torque Tcp1a to engage the second dog clutch 206 when it is determined that the first dog clutch 202 is engaged. Therefore, when the second dog clutch 206 is engaged, even if the load acting on the second movable sleeve 208 is reduced at the time of engagement of the second dog clutch 206, the second meshing teeth 208a of the second movable sleeve 208 mesh with the second meshing teeth 226a of the differential casing 226c. As a result, the load acting on the second movable sleeve 208 can suitably be reduced at the time of engagement of the second dog clutch 206, and the deterioration of the NV performance can be suppressed.

Although the examples of the present invention have been described in detail with reference to the drawings, the present invention is also applicable in other forms.

For example, in the second example described above, the third actuator 222 includes the electric motor and the conversion mechanism, for example, and the rotation of the electric motor is converted by the conversion mechanism into the motion in the first rotation axis C1 direction to move the first movable sleeve 204 in the first rotation axis C1 direction; however, instead of the electric motor and the conversion mechanism, for example, a hydraulic cylinder etc. may be used for moving the first movable sleeve 204 in the first rotation axis C1 direction. In the second example described above, the fourth actuator 232 includes the electric motor and the conversion mechanism, for example, and the rotation of the electric motor is converted by the conversion mechanism into the motion in the second rotation axis C2 direction to move the second movable sleeve 208 in the second rotation axis C2 direction; however, instead of the electric motor and the conversion mechanism, for example, a hydraulic cylinder etc. may be used for moving the second movable sleeve 208 in the second rotation axis C2 direction.

The second torques Tcp2, Tcp2a are torques larger than zero in the examples described above; however, for example, the second torques Tcp2, Tcp2a may be set to zero.

The above description is merely an embodiment and the present invention can be implemented in variously modified and improved forms based on the knowledge of those skilled in the art.

REFERENCE SIGNS LIST 10, 200: four-wheel drive vehicle
12: engine (drive power source)
14L, 14R: front wheel (main drive wheel)
16L, 16R: rear wheel (sub-drive wheel)
26, 202: first dog clutch
30: propeller shaft (power transmitting member)
36, 206: second dog clutch
40c, 226c: differential casing (second input rotating member)
42, 218: input shaft (first input rotating member)
46, 220: first ring gear (first output rotating member)
54, 204: first movable sleeve (first sleeve)
96, 228: second ring gear (second output rotating member)
96b: second meshing teeth
100, 250: electronic control device (control device)
108, 208: second movable sleeve (second sleeve)
108a: second meshing teeth (meshing teeth)
112: second electromagnetic actuator (actuator)
114: second ratchet mechanism (ratchet mechanism)
124a: first piston
128: second spring (spring)
130: second piston
132: holder
132a: first latching teeth (latching teeth)
132b: second latching teeth (latching teeth)
140, 234: synchromesh mechanism
146: control coupling (coupling)
160a: switching condition satisfaction determining portion
164, 254: second clutch control portion
166, 256: synchronization determining portion
168, 258: first clutch control portion
168a, 258a: engagement determining portion
C1: first rotation axis
C2: second rotation axis
Nr1: rotation speed of the first ring gear 46
Nr2: rotation speed of the second ring gear 96
Nr1a: rotation speed of the first ring gear 220
Nr2a: rotation speed of the second ring gear 228
Tcp: coupling torque (engagement torque)
Tcp1, Tcp1a: first torque
Tcp2, Tcp2a: second torque

What is claimed is:

1. A four-wheel drive vehicle comprising: main drive wheels and sub-drive wheels;
a first input rotating member to which a portion of a drive power from a drive power source toward the main drive wheels is input; a first output rotating member coupled via a power transmitting member to the sub-drive wheels wherein the first input rotating member and the first output rotating member rotate around a common first rotation axis; a second input rotating member disposed on a power transmission path between the power transmitting member and the sub-drive wheels and coupled to the sub-drive wheels; a second output rotating member disposed on the power transmission path between the power transmitting member and the sub-drive wheels wherein the second input rotating member and the second output rotating member rotate around a common second rotation axis; a coupling disposed on a power transmission path between the power transmitting member and the second output rotating member; a first dog clutch including a first sleeve spline-fitted to one of the first input rotating member and the first output rotating member and moved in a first rotation axis direction to selectively mesh with the other of the first input rotating member and the first output rotating member; a second dog clutch including a second sleeve spline-fitted to one of the second input rotating member and the second output rotating member and moved in a second rotation axis direction to selectively mesh with the other of the second input rotating member and the second output rotating member; a synchromesh mechanism included in the second dog clutch and arranged in series with the second sleeve in the second rotation axis direction to synchronize rotation speeds between the second input rotating member and the second output rotating member when the second sleeve is moved in the second rotation axis direction; and a control device controlling each of the coupling, the first dog clutch, and the second dog clutch, wherein in the case of canceling a disconnect state in which the power transmitting member interrupts power transmission from the drive power source and the sub-drive wheels, the control device controls an engagement torque of the coupling to a preset first torque and operates the synchromesh mechanism to engage the first dog clutch when it is determined that the rotation speeds are synchronized between the second input rotating member and the second output rotating member, and controls the engagement torque of the coupling to a second torque smaller than the first torque to engage the second dog clutch when it is determined that the first dog clutch is engaged.

2. The four-wheel drive vehicle according to claim 1, wherein the first torque is an engagement torque enabling direct coupling of the coupling such that a rotation speed of the first output rotating member and the rotation speed of the second output rotating member become equal when the synchromesh mechanism is operating.

3. The four-wheel drive vehicle according to claim 2, wherein
the second sleeve includes meshing teeth for meshing with second meshing teeth formed on the second output rotating member and is disposed relatively non-rotatably with respect to the second input rotating member and movably in the second rotation axis direction with respect to the second input rotating member, and wherein
the four-wheel drive vehicle includes
a spring urging the second sleeve from a non-meshing position at which meshing is released between the meshing teeth and the second meshing teeth to a meshing position at which the meshing teeth are meshed with the second meshing teeth,
an actuator, and
a ratchet mechanism that includes a first piston reciprocated in the second rotation axis direction by the actuator, a second piston moving the second sleeve to the non-meshing position against an urging force of the spring in accordance with the first piston, and a holder having a plurality of latching teeth and latching the second piston moved due to the first piston with one of the plurality of latching teeth and that changes a position of the second piston latched with the latching teeth of the holder to move the second sleeve between the non-meshing position and the meshing position.

4. The four-wheel drive vehicle according to claim 3, wherein the second torque is larger than zero.

5. The four-wheel drive vehicle according to claim 4, wherein the main drive wheels are front wheels, and wherein the sub-drive wheels are rear wheels.

6. The four-wheel drive vehicle according to claim 3, wherein the main drive wheels are front wheels, and wherein the sub-drive wheels are rear wheels.

7. The four-wheel drive vehicle according to claim 2, wherein the second torque is larger than zero.

8. The four-wheel drive vehicle according to claim 7, wherein the main drive wheels are front wheels, and wherein the sub-drive wheels are rear wheels.

9. The four-wheel drive vehicle according to claim 2, wherein the main drive wheels are front wheels, and wherein the sub-drive wheels are rear wheels.

10. The four-wheel drive vehicle according to claim 1, wherein
the second sleeve includes meshing teeth for meshing with second meshing teeth formed on the second output rotating member and is disposed relatively non-rotatably with respect to the second input rotating member and movably in the second rotation axis direction with respect to the second input rotating member, and wherein
the four-wheel drive vehicle includes
a spring urging the second sleeve from a non-meshing position at which meshing is released between the meshing teeth and the second meshing teeth to a meshing position at which the meshing teeth are meshed with the second meshing teeth,
an actuator, and
a ratchet mechanism that includes a first piston reciprocated in the second rotation axis direction by the actuator, a second piston moving the second sleeve to the non-meshing position against an urging force of the spring in accordance with the first piston, and a holder having a plurality of latching teeth and latching the second piston moved due to the first piston with one of the plurality of latching teeth and that changes a position of the second piston latched with the latching teeth of the holder to move the second sleeve between the non-meshing position and the meshing position.

11. The four-wheel drive vehicle according to claim 10, wherein the second torque is larger than zero.

12. The four-wheel drive vehicle according to claim 11, wherein the main drive wheels are front wheels, and wherein the sub-drive wheels are rear wheels.

13. The four-wheel drive vehicle according to claim 10, wherein the main drive wheels are front wheels, and wherein the sub-drive wheels are rear wheels.

14. The four-wheel drive vehicle according to claim 1, wherein the second torque is larger than zero.

15. The four-wheel drive vehicle according to claim 14, wherein the main drive wheels are front wheels, and wherein the sub-drive wheels are rear wheels.

16. The four-wheel drive vehicle according to claim 1, wherein the main drive wheels are front wheels, and wherein the sub-drive wheels are rear wheels.

* * * * *